United States Patent
Yao et al.

(10) Patent No.: US 12,155,885 B2
(45) Date of Patent: Nov. 26, 2024

(54) MODULATION METHOD AND APPARATUS, COMMUNICATIONS DEVICE, AND READABLE STORAGE MEDIUM

(71) Applicant: VIVO MOBILE COMMUNICATION CO., LTD., Guangdong (CN)

(72) Inventors: Jian Yao, Guangdong (CN); Dajie Jiang, Guangdong (CN); Kun Yang, Guangdong (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 12 days.

(21) Appl. No.: 18/116,342

(22) Filed: Mar. 2, 2023

(65) Prior Publication Data
US 2023/0209122 A1 Jun. 29, 2023

Related U.S. Application Data

(63) Continuation of application No. PCT/CN2021/116595, filed on Sep. 6, 2021.

(30) Foreign Application Priority Data

Sep. 10, 2020 (CN) .......................... 202010949624.3

(51) Int. Cl.
*H04N 21/426* (2011.01)
*H04B 7/0456* (2017.01)
*H04L 27/34* (2006.01)

(52) U.S. Cl.
CPC ..... *H04N 21/42607* (2013.01); *H04B 7/0473* (2013.01); *H04L 27/3405* (2013.01)

(58) Field of Classification Search
CPC ........... H04N 21/42607; H04B 7/0473; H04B 7/0413; H04B 7/0874; H04B 7/0604;
(Continued)

(56) References Cited

U.S. PATENT DOCUMENTS

2013/0028213 A1* 1/2013 Ko .................. H04L 1/1607
370/329
2016/0269885 A1* 9/2016 Kim .................. H04L 5/001
(Continued)

FOREIGN PATENT DOCUMENTS

CN     102130755 A     7/2011
CN     104539336 A     4/2015
(Continued)

OTHER PUBLICATIONS

First Office Action for Chinese Application No. 202010949624.3, dated Jan. 4, 2023, 6 Pages.
(Continued)

*Primary Examiner* — Khanh C Tran
(74) *Attorney, Agent, or Firm* — BROOKS KUSHMAN P.C.

(57) ABSTRACT

This application relates to the field of communications technologies, and discloses a modulation method and apparatus, a communications device, and a readable storage medium. The method includes: obtaining a bitstream to be transmitted; and determining, based on a bit in the bitstream and a mapping relationship, a forwarding pattern and a manner of modulating a forwarding phase in the forwarding pattern, where the mapping relationship is used to indicate a mapping relationship between the bit, the forwarding pattern, and a target index, and is used to indicate a mapping relationship between the bit and the phase modulation manner; and the target index includes at least one of the following: an index of a transmit antenna, an index of a receive antenna, and an index of an area after division of an array of assistance nodes.

20 Claims, 8 Drawing Sheets

(58) Field of Classification Search
CPC . H04L 27/3405; H04L 27/18; H04L 27/3411; H04L 27/3444
See application file for complete search history.

(56) References Cited

U.S. PATENT DOCUMENTS

| | | | |
|---|---|---|---|
| 2019/0181928 | A1 | 6/2019 | Pan |
| 2019/0386867 | A1* | 12/2019 | Liu .................. H04L 27/36 |
| 2020/0145069 | A1 | 5/2020 | Ferrante et al. |
| 2021/0099385 | A1* | 4/2021 | Huang ............ H04B 7/15528 |

FOREIGN PATENT DOCUMENTS

| | | |
|---|---|---|
| CN | 106982086 A | 7/2017 |
| CN | 107959519 A | 4/2018 |
| CN | 108234082 A | 6/2018 |
| CN | 109302216 A | 2/2019 |
| CN | 109792272 A | 5/2019 |
| CN | 110177067 A | 8/2019 |
| CN | 110213194 A | 9/2019 |
| CN | 111211824 A | 5/2020 |
| CN | 111355519 A | 6/2020 |
| CN | 111464223 A | 7/2020 |

OTHER PUBLICATIONS

International Search Report and Written Opinion for Application No. PCT /CN2021/116595, dated Nov. 26, 2021, 8 Pages.
IEEE Communications Letters "Enhancing Spatial Modulation System Performance Through Signal Space Diversity" Saud Althunibat, Raed Mesleh, Jun. 2018, 4 Pages.
Journal of Chongqing University of Posts and Telecommunications (Natural Science Edition) vol. 32 No. 2 "Receive antenna selection for pre-coding aided spatial modulation under MIMO" Li Guiyong, Zheng Kaifang, Xiang Jiao, Zhao Guohui, Apr. 2020, 5 Pages.
Extended European Search Report for Application No. 21865933.2, dated Feb. 7, 2024, 7 Pages.
Qiang Li et al., School of Electronic and Information Engineering South China University of Technology, "Single-RF MIMO: From Spatial Modulation to Metasurface-Based Modulation" Guangzhou, China, Sep. 2020, 17 Pages.

* cited by examiner

MODULATION METHOD AND APPARATUS, COMMUNICATIONS DEVICE, AND READABLE STORAGE MEDIUM

CROSS-REFERENCE TO RELATED APPLICATIONS

This application is a continuation of International Application No. PCT/CN2021/116595 filed on Sep. 6, 2021, which claims priority to Chinese Patent Application No. 202010949624.3 filed on Sep. 10, 2020, which are incorporated herein by reference in their entireties.

TECHNICAL FIELD

This application relates to the field of communications technologies, and in particular, to a modulation method and apparatus, a communications device, and a readable storage medium.

BACKGROUND

In a conventional mobile communications system, based on assistance of a reconfigurable intelligent surface (RIS), spatial modulation is performed based on an index of a receive antenna. But performing spatial modulation merely by maximizing a power of one receive antenna by adjusting an MS forwarding phase brings low efficiency of modulation.

SUMMARY

Embodiments of this application provide a modulation method and apparatus, a communications device, and a readable storage medium, and can solve the problem in the prior art that performing spatial modulation merely by maximizing a power of one receive antenna by adjusting an RIS forwarding phase brings low efficiency of modulation.

A first aspect provides a modulation method, performed by a first communications device, and including: obtaining a bitstream to be transmitted; and determining, based on a bit in the bitstream and a preset mapping relationship, a phase pattern and a manner of modulating a forwarding phase in the phase pattern, where the mapping relationship is used to indicate a mapping relationship between the bit, the phase pattern, and a target index of a receive antenna with a largest receive power, and is used to indicate a mapping relationship between the bit and the phase modulation manner; and the target index includes at least one of the following: an index of a transmit antenna, an index of a receive antenna, and an index of an area after division of an array of assistance nodes.

A second aspect provides a modulation apparatus, including: an obtaining module, configured to obtain a bitstream to be transmitted; and a modulation module, configured to determine, based on a bit in the bitstream and a mapping relationship, a forwarding pattern and a manner of modulating a forwarding phase in the forwarding pattern, where the mapping relationship is used to indicate a mapping relationship between the bit, the forwarding pattern, and a target index, and is used to indicate a mapping relationship between the bit and the phase modulation manner; and the target index includes at least one of the following: an index of a transmit antenna, an index of a receive antenna, and an index of an area after division of an array of assistance nodes.

A third aspect provides a communications device. The communications device includes a processor, a memory, and a program or an instruction that is stored in the memory and that can run on the processor, and when the program or the instruction is executed by the processor, steps in the method described in the first aspect are implemented.

A fourth aspect provides a readable storage medium. The readable storage medium stores a program or an instruction, and when the program or the instruction is executed by a processor, the steps of the method according to the first aspect are implemented.

A fifth aspect provides a chip. The chip includes a processor and a communications interface, the communications interface is coupled to the processor, and the processor is configured to run a program or an instruction of a network side device to implement the method according to the first aspect.

A sixth aspect provides a computer software product. The computer software product is stored in a non-volatile storage medium, and the software product is configured to be executed by at least one processor to implement the steps of the method according to the first aspect.

A seventh aspect provides a communications device. The communications device is configured to perform the method according to the first aspect.

In the embodiments of this application, spatial modulation can be implemented by determining, based on a bit in a bitstream to be transmitted and a mapping relationship, a forwarding pattern, and phase modulation can be implemented in a manner of modulating a forwarding phase in the forwarding pattern based on the bit and the mapping relationship; and because the mapping relationship is used to indicate a mapping relationship between the bit, the forwarding pattern, and a target index, the target index includes at least one of the following: an index of a transmit antenna, an index of a receive antenna, and an index of an area after division of an array of assistance nodes; that is, during spatial modulation, modulation is not performed merely based on an index of a receive antenna, but a combination of an index of a receive antenna, an index of a transmit antenna, an index of an area after division of an array of assistance nodes is used for spatial modulation of a higher order. Clearly, the embodiments of this application can not only implement spatial modulation and phase modulation at the same time, but also implement spatial modulation of a higher order than that in a conventional technology, thereby solving the problem that performing spatial modulation merely by maximizing a power of one receive antenna by adjusting an RIS forwarding phase brings low efficiency of modulation, and thus improving efficiency of modulation.

DETAILED DESCRIPTION

The following clearly describes the technical solutions in the embodiments of this application in conjunction with the accompanying drawings in the embodiments of this application. Clearly, the described embodiments are some but not all of the embodiments of this application. All other embodiments obtained by a person of ordinary skill in the art based on the embodiments of this application shall fall within the protection scope of this application.

The terms "first", "second", and the like in the description and the claims of this application are used to distinguish between similar objects instead of describing a specific order or sequence. It should be understood that, data used in this way is interchangeable in proper circumstances, so that the embodiments of this application can be implemented in an order other than the order illustrated or described herein. Objects classified by "first" and "second" are usually of a same type, and the number of objects is not limited. For example, there may be one or more first objects. In addition, in the description and the claims, "and/or" represents at least one of connected objects, and a character "I" generally represents an "or" relationship between associated objects.

It should be noted that the technology described in the embodiments of this application is not limited to a Long Term Evolution (LTE)/LTE-advanced (LTE-A) system, and may also be used in other wireless communications systems, for example, Code Division Multiple Access (CDMA), Time Division Multiple Access (TDMA), Frequency Division Multiple Access (FDMA), Orthogonal Frequency Division Multiple Access (OFDMA), and Single-carrier Frequency-Division Multiple Access (SC-FDMA). The terms "system" and "network" in the embodiments of this application may be used interchangeably. The described technologies can be applied to both the systems and the radio technologies mentioned above as well as to other systems and radio technologies. However, a new radio (NR) system is described in the following descriptions for illustrative purposes, and the NR terminology is used in most of the following descriptions, although these techniques can also be applied to applications other than the NR system application, for example, the 6th generation (6G) communications system.

Figure 1:
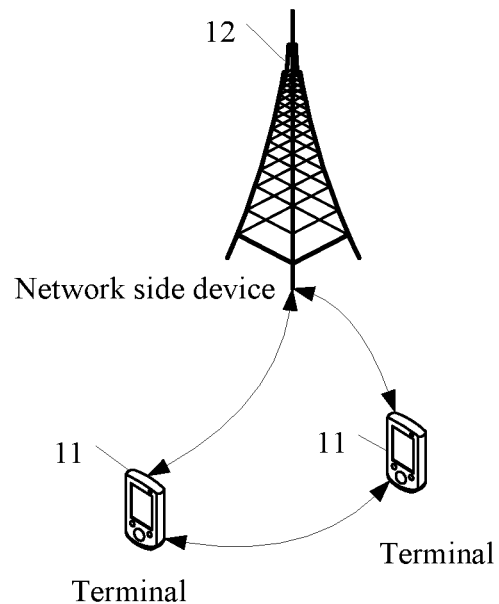
FIG. 1 is a block diagram of a wireless communications system to which an embodiment of this application can be applied.

FIG. 1 is a block diagram of a wireless communications system to which an embodiment of this application can be applied. The wireless communications system includes a terminal 11 and a network side device 12. The terminal 11 may also be referred to as a terminal device or user equipment (UE). The terminal 11 may be a terminal side device such as a mobile phone, a tablet personal computer, or a laptop computer, or called a notebook computer, a personal digital assistant (PDA), a palmtop computer, a netbook, an ultra mobile personal computer (UMPC), a mobile internet device (MID), a wearable device, vehicle user equipment (VUE), or pedestrian user equipment (PUE). The wearable device includes bracelets, headphones, glasses, etc. It should be noted that a specific type of the terminal 11 is not limited in the embodiments of this application. The network side device 12 may be a base station or a core network. The base station may be referred to as a Node B, an evolved Node B, an access point, a base transceiver station (BTS), a radio base station, a radio transceiver, a basic service set (BSS), an extended service set (ESS), a Node B, an evolved Node B (eNB), a home Node B, a home evolved Node B, a wireless local area network (WLAN) access point, a wireless fidelity (Wi-Fi) node, a transmission and reception point (TRP), or other certain appropriate terms in the art. Provided that the same technical effects are achieved, the base station is not limited to specific technical vocabulary. It should be noted that in the embodiments of this application, a base station in the NR system is merely used as an example, but does not limit a specific type of the base station.

First of all, the terms used in the embodiments of this application are explained below.

Figure 2:
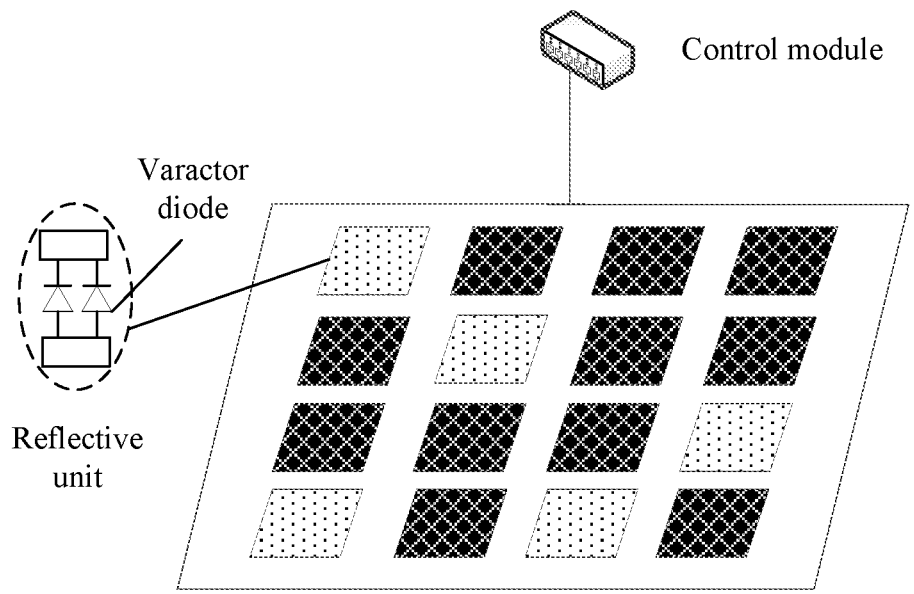
FIG. 2 is a schematic diagram of an MS with a variable resonator according to an embodiment of this application.

Reconfigurable Intelligent Surface (RIS):

RIS is composed of and enabled by a programmable super surface that can control electromagnetic signals in real time in wireless communications. In recent years, programmable intelligent super surfaces demonstrate a great prospect of being extensively applied and draws a wide attention. They consist of specially designed and regular arrangements of electromagnetic units that usually include metals, media, and variable elements. By controlling the variable elements in the electromagnetic units, for example, varying a bias voltage of a varactor diode, as shown in FIG. 2, an electromagnetic parameter, for example, an amplitude, a phase, polarization, and even an orbital angular momentum, of a reflected or transmitted electromagnetic wave is changed in a programmable manner.

Because a radio frequency and a baseband processing circuit are not required, compared with a conventional wireless communications transceiving device, a reconfigurable intelligent surface has several edges:

1) an RIS device brings lower costs and complexity for implementation;
2) an RIS device has a lower power consumption;
3) an RIS device does not bring in extra thermal noises from a receive end;
4) an RIS device is thin and light, favorable for achieving flexible deployment; and
5) an RIS device has a full-frequency band response, and ideally, can work in any frequency.

An RIS is usually used in a mobile communications system as an auxiliary relay to build a controllable propagation channel, to improve a wireless communications environment and enhance the quality of signals at a receive end. Meanwhile, being thin and light with controllable costs and excellent performance in controlling electromagnetic parameters of an electromagnetic wave with flexibility, an MS structure has become a new transmitter-array architecture that may replace conventional transmitter links. Using an MS can modulate baseband information directly to a radio frequency carrier. A receive end receives the information directly modulated by the RIS by detecting a phase/amplitude change of a forwarded signal.

A reconfigurable intelligent surface is a name of an intelligent surface, and an intelligent surface can also be referred to as the plurality of following relevant terms that all represent similar techniques or entities, for example, a large intelligent surface (LIS), a smart reflect-array (SRA), a reconfigurable reflect-array (RRA), and an intelligent reflecting surface (IRS). A reconfigurable intelligent surface mentioned in this application includes, but is not limited to, the foregoing names.

Spatial Modulation (SM) Technique:

The SM technique, as a multiple input multiple output (MIMO) transmission solution, is one of the index modulation (IM) techniques that uses an active state of an antenna as a carrier to transfer information. The core idea is that data is transmitted in any slot for sending with only one or more activated antennas. Other antennas stay inactivated and are not used for data transmission. Different combinations of indices of the activated antennas are used to represent a part of information of a transmitted bit. The spatial modulation technique can prevent interference and synchronization between antennas and further improve efficiency of a frequency spectrum. In specific hardware implementation, compared with a MIMO system requiring a plurality of radio frequency links, a transmit end of a spatial modulation system only needs a single radio frequency unit, bringing much lower hardware overheads than that in the MIMO transmission technology. This can not only simplify a MIMO structure and reduce implementation costs, but also satisfy diversified requirements on link configurations in a future communications system.

Figure 3:
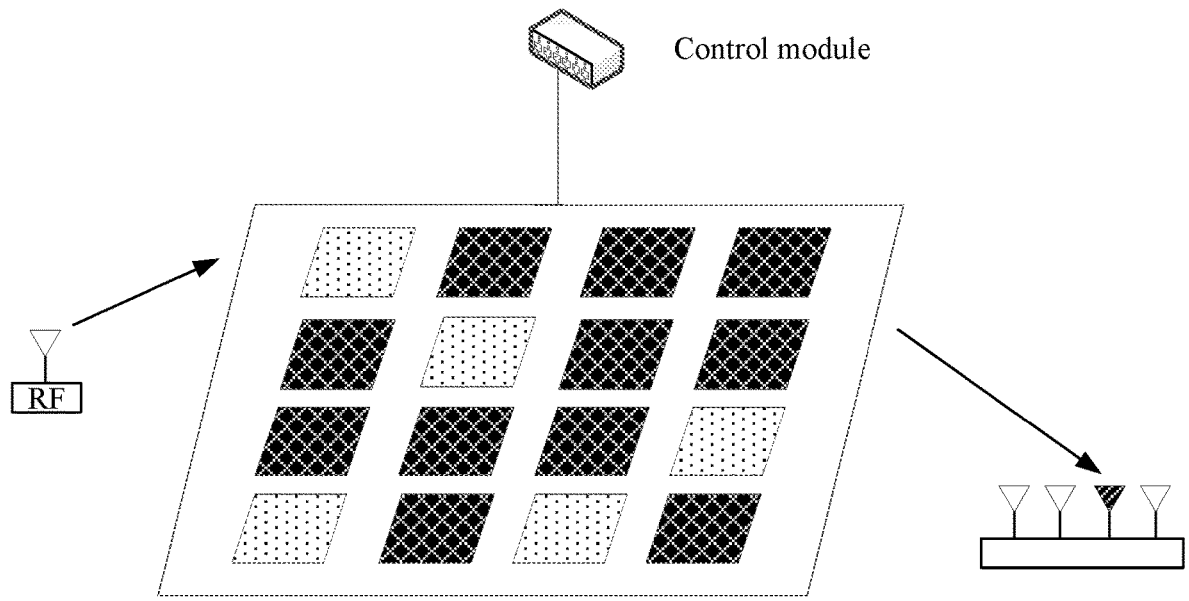
FIG. 3 is a schematic diagram of MS-based modulation of an index of a receive antenna according to an embodiment of this application.

By using a common spatial modulation technique, different transmitted information is represented by activating different transmit antennas, while an RIS can change a channel environment and further change a signal-noise ratio of a receive antenna. Therefore, combining the spatial modulation technique and an RIS can implement a spatial modulation solution based on an index of a receive antenna, as shown in FIG. 3. Several forwarding beams are selected by pre-training a forwarding phase of an intelligent surface. Different forwarding beams may correspond to different antenna receiving modes of a receive end (for example, correspond to different optimal receive antennas). In conjunction with the accompanying drawings, a modulation method provided in the embodiments of this application is described in detail below with specific embodiments and application scenarios thereof.

Figure 4:
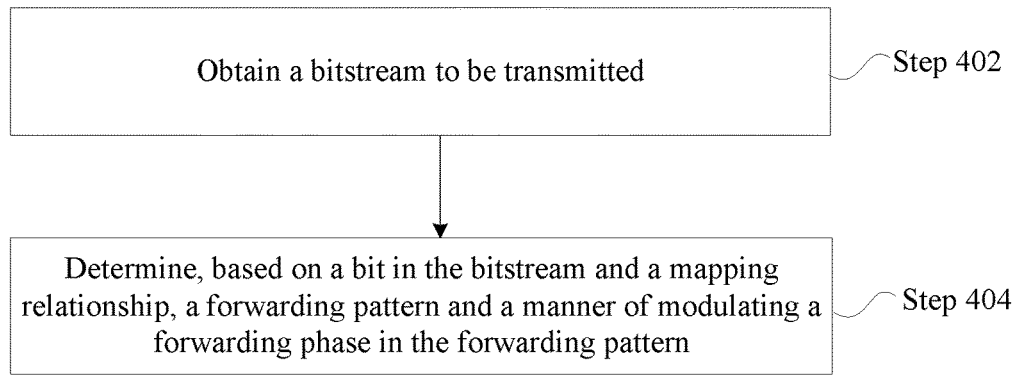
FIG. 4 is a flowchart of a modulation method according to an embodiment of this application.

The embodiments of this application provide a modulation method. The method is performed by a first communications device. FIG. 4 is a flowchart of the modulation method according to this embodiment of this application. As shown in FIG. 4, steps of the method include:

step 402: obtaining a bitstream to be transmitted; and step 404: determining, based on a bit in the bitstream and a mapping relationship, a forwarding pattern and a manner of modulating a forwarding phase in the forwarding pattern, where the mapping relationship is used to indicate a mapping relationship between the bit, the forwarding pattern, and a target index, and is used to indicate a mapping relationship between the bit and the phase modulation manner; and the target index includes at least one of the following: an index of a transmit antenna, an index of a receive antenna, and an index of an area after division of an array of assistance nodes.

Through step S402 and step S404 in this embodiment of this application, spatial modulation can be implemented by determining, based on a bit in a bitstream to be transmitted and a mapping relationship, a forwarding pattern, and phase modulation can be implemented in a manner of modulating a forwarding phase in the forwarding pattern based on the bit and the mapping relationship; and because the mapping relationship is used to indicate a mapping relationship between the bit, the forwarding pattern, and a target index, the target index includes at least one of the following: an index of a transmit antenna, an index of a receive antenna, and an index of an area after division of an array of assistance nodes; that is, during spatial modulation, modulation is not performed merely based on an index of a receive antenna, but a combination of an index of a receive antenna, an index of a transmit antenna, an index of an area after division of an array of assistance nodes is used for spatial modulation of a higher order. Clearly, the embodiments of this application can not only implement spatial modulation and phase modulation at the same time, but also implement spatial modulation of a higher order than that in a conventional technology, thereby solving the problem that performing spatial modulation merely by maximizing a power of one receive antenna by adjusting an RIS forwarding phase brings low efficiency of modulation, and thus improving efficiency of modulation.

It should be noted that the forwarding pattern in this embodiment of this application may be a set of states of controlling, by each unit of an assistance node, a forwarding amplitude, phase, or polarization of a radio signal. The assistance node is used for signal forwarding, for example, forwarding a signal from the first communications device to a second communications device; and in a specific application scenario, the assistance node may be an intelligent surface. The first communications device and the second communications device in this embodiment of this application may be network side devices or terminals. For example, the first communications device is a network side device, and the second communications device is a terminal; or if the first communications device is a terminal, the second communications device is a network side device.

The modulation method according to the embodiments of this application is described in detail below with different combinations of the index of the transmit antenna, the index of the receive antenna, and the index of the area after the division of the array of assistance nodes.

Manner 1: The determining, based on a bit in the bitstream and a mapping relationship, a forwarding pattern and a manner of modulating a forwarding phase in the forwarding pattern in step 404 may further include:

Step 404-11: determining the forwarding pattern based on a first bit in the bitstream and a first mapping relationship, where the first mapping relationship is used to indicate a mapping relationship between the first bit, the index of the receive antenna, and a forwarding pattern corresponding to the index of the receive antenna; and a power of the receive antenna is greater than or equal to a first preset threshold.

It should be noted that the first preset threshold may be a value assigned as actual conditions require. That is, there may be one or more receive antennas whose power is greater than the first preset threshold.

Step 404-12: modulating the forwarding phase in the forwarding pattern based on a second bit in the bitstream and a second mapping relationship, where the second mapping relationship is used to indicate a mapping relationship between the second bit and the manner of modulating a phase value.

Before the bitstream to be transmitted is obtained in step 402 according to this embodiment of this application, the first mapping relationship may be obtained in one of the following manners:

1) training the forwarding pattern based on a radio signal sent by the first communications device to the second communications device to obtain a training result, where the training result includes: the first mapping relationship between the index of the receive antenna, the forwarding pattern, and the first bit; or
2) receiving a measurement signal sent by the second communications device, and calculating the measurement signal to obtain a calculation result, where the calculation result includes: the first mapping relationship between the index of the receive antenna, the forwarding pattern, and the first bit.

Figure 5:
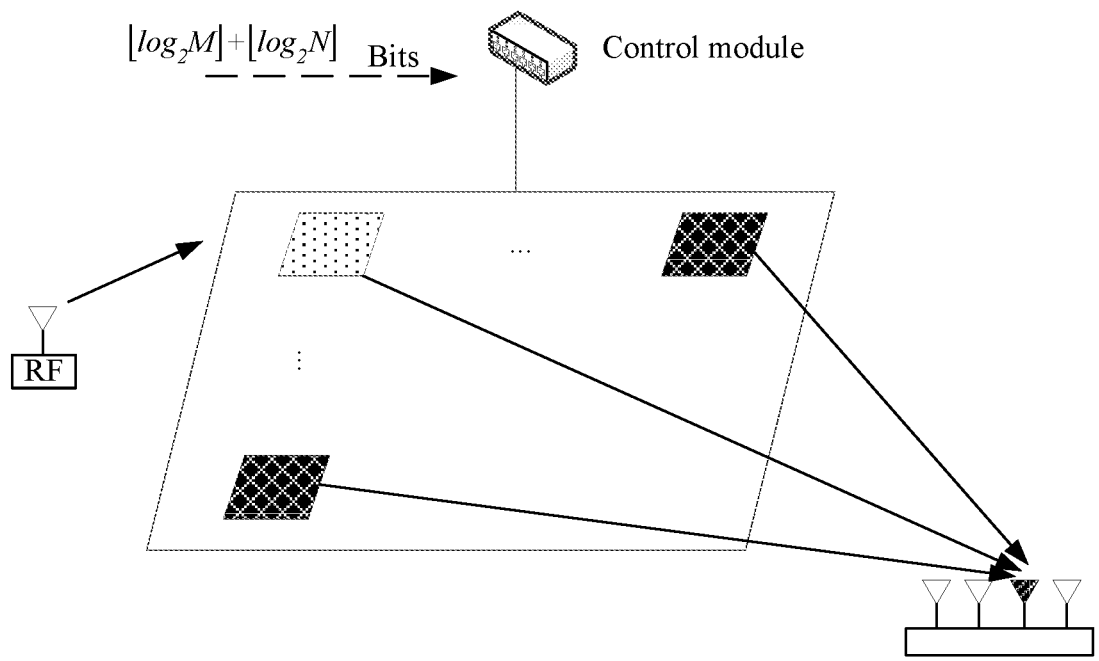
FIG. 5 is a first schematic diagram of MS-based hybrid index modulation according to an embodiment of this application.

An example in which the forwarding pattern is a forwarding-phase pattern is used below to describe the hybrid modulation manner in Manner 1 with examples in combination with a specific implementation. In conjunction with FIG. 5, a process of the hybrid index modulation in this specific implementation may be: dividing a bitstream $\lfloor \log_2 M \rfloor + \lfloor \log_2 N \rfloor$ into two parts, where the bit information $\lfloor \log_2 M \rfloor$ is used for MPSK phase modulation by controlling an overall phase of an RIS array, the bit information $\lfloor \log_2 N \rfloor$ is used for spatial modulation by switching an RIS forwarding-phase pattern, and N represents a quantity of antennas of a receiver.

A specific process of the hybrid modulation includes two stages:

A first stage is a stage for training. To be specific, a corresponding RIS (corresponding to an assistance node) forwarding-phase pattern that maximizes receive powers of different antennas of a receive end is determined. The RIS may be a relay that is integrated to a transmit end or used as a transmit end and a receive end. In addition, the receive powers of the receive antennas being largest is because the first preset threshold is set to relatively large, and a receive antenna with a power greater than the first preset threshold is an antenna with a largest power among all receive antennas.

Because the RIS may be an active RIS, or may be a passive RIS, for a passive RIS (that is not capable of receiving or detecting a signal), a set of RIS forwarding-phase patterns are preset based on factors such as an interval arranged between RIS reflective or transmissive units, an orientation of a receiver, and a quantity of receive antennas, with the purpose of decreasing a quantity of patterns in the set of MS forwarding-phase patterns and reducing training overheads. A manner of controlling a forwarding phase of each unit may be: controlling the forwarding phase of each unit by enabling an on state and an off state of X PIN diodes corresponding to X units, where for example, on indicates that the phase is pi, and off indicates that the phase is 0; or controlling the forwarding phase of each unit by controlling a bias voltage of a varactor diode of each forwarding unit, where for example, different voltages for each RIS unit represent different phases.

In a process of pattern training, a transmit end transmits a radio signal (the signal may be a single-frequency carrier signal or a reference signal in a radio system, for example, a synchronization signal and PBCH block (SSB), a channel state information reference signal (CSI-RS), or a sounding reference signal (SRS)) that arrives at a receive end after being reflected or transmitted by the RIS. The RIS side traverses, based on the preset set of forwarding-phase patterns, forwarding-phase patterns in the set in a manner of time division. The receiver detects receive powers of different antennas in a same time unit to determine a receive antenna with a largest receive antenna power and a corresponding forwarding-phase pattern. For example, the receiver has two receive antennas, and in one time unit, a power of a receive antenna 1 is the largest, where a forwarding-phase pattern at this moment is denoted as a pattern 1 and used to represent a bit 0 (the first bit); or if a power of a receive antenna 2 is the largest, a forwarding-phase pattern at this moment is denoted as a pattern 2 and used to represent a bit 1 (the first bit), as shown in Table 1. The receiver feeds back a pattern training result to the RIS, and the training result includes at least one of the following parameters: a moment at which one pattern appears, an index of a corresponding reference signal, a signal strength of a corresponding received signal, an index of a corresponding receive antenna, or another parameter indicating a correspondence relationship between a pattern and an index of a receive antenna.

For an active RIS (that is capable of receiving and detecting a signal), the receiver transmits a measurement signal, and the RIS determines channel state information based on a detection result, and further calculates to obtain a forwarding-phase pattern that maximizes receive powers of different antennas of the receiver. For example, the receiver has two receive antennas, where a forwarding-phase pattern, obtained by calculation, that maximizes a power of a receive antenna 1 is denoted as a pattern 1 and used to represent a bit 0 (the first bit), and a forwarding-phase pattern that maximizes a power of a receive antenna 2 is denoted as a pattern 2 and used to represent a bit 1 (the first bit), as shown in Table 1.

TABLE 1

| Bit | Index of a receive antenna with a largest receive power | Phase pattern corresponding to the index of the receive antenna with the largest receive power |
|---|---|---|
| 0 | 1 | 1 |
| 1 | 2 | 2 |

After the foregoing training process is completed, the transmit end or the intelligent surface sends information to the receive end, and the information is used to indicate a quantity of parameter combinations needed for transmission and forwarding in a subsequent stage of communication, a correspondence relationship between corresponding bit information, a quantity of bits carried in phase modulation, and a manner of modulating.

A second stage is a stage for sending. To be specific, a transmitted bitstream is divided into two parts, where one part of bits is used to determine a selected forwarding-phase pattern for spatial modulation, and the other part of bits is used to determine a phase adjustment value of a current forwarding-phase pattern for phase modulation.

A bit is mapped to a forwarding-phase pattern, that is, to an index of a specific receive antenna, by using one part of bits to be transmitted, based on the pattern training result in the first stage. For example, the receiver has two receive antennas, and one bit can be modulated. According to Table 1, when a transmitted bit is 0, controlling an on state and an off state of a PIN diode corresponding to each reflective or transmissive unit of the RIS or a bias voltage of a varactor diode thereof to put the RIS in a forwarding-phase pattern 1, and in this case, the receive power of the receive antenna 1 is the largest; or when a transmitted bit is 1, controlling an on state and an off state of a PIN diode corresponding to each reflective or transmissive unit of the RIS or a bias voltage of a varactor diode thereof to put the RIS in a forwarding-phase pattern 2, and in this case, the receive power of the receive antenna 2 is the largest.

After the forwarding-phase pattern is determined, a same way of phase value adjustment, for example, binary phase shift keying (BPSK) modulation, is performed, by using the other part of bits to be transmitted, based on the current forwarding-phase pattern, on all forwarding phases in the pattern. According to Table 2, all the forwarding phases in the pattern undergo a 0/pi flip, and in this case, a relationship between strengths of powers of different antennas of the receiver for receiving signals remains unchanged.

TABLE 2

| Transmitted bit | Is there a phase flip? |
| --- | --- |
| 0 | Yes (for example, all phases + pi) |
| 1 | No (i.e., phase remains unchanged) |

For demodulation at the receive end, first of all, incoherent detection is performed on each receive antenna, an index of the receive antenna is determined, and then, based on the information, coherent detection is performed on a signal received on the antenna; or an index of the receive antenna and phase information are determined through maximum likelihood (ML) detection.

Manner 2: The determining, based on a bit in the bitstream and a mapping relationship, a forwarding pattern and a manner of modulating a forwarding phase in the forwarding pattern in step 404 may further include:

step 404-21: determining, based on a third bit in the bitstream and a third mapping relationship, an index of a first target area, where the third mapping relationship is used to indicate a mapping relationship between the index of the first target area and the third bit, and the first target area is an area in a plurality of areas after the division of the array of assistance nodes;

step 404-22: determining, by using the index of the first target area, the forwarding pattern based on a fourth bit in the bitstream and a fourth mapping relationship, where the fourth mapping relationship is used to indicate a mapping relationship between the fourth bit, the index of the receive antenna, and a forwarding pattern corresponding to the index of the receive antenna; and a power of the receive antenna is greater than or equal to a second preset threshold; and step 404-23: modulating the forwarding phase in the determined forwarding pattern based on a fifth bit in the bitstream and a fifth mapping relationship, where the fifth mapping relationship is used to indicate a mapping relationship between the fifth bit and the manner of modulating a phase value.

Before step 402 in this embodiment of this application of obtaining the bitstream to be transmitted between the first communications device and the second communications device, the fourth mapping relationship may be obtained in one of the following manners:

1) dividing the array of assistance nodes into the plurality of areas, and training the forwarding pattern based on a radio signal sent by the first communications device to the second communications device to obtain a training result, where the training result includes: the fourth mapping relationship between the index of the receive antenna, the forwarding pattern, and the fourth bit; and the fourth mapping relationship is obtained through training in each target area; and 2) receiving a measurement signal sent by the second communications device, and calculating the measurement signal to obtain a calculation result, where the calculation result includes: the fourth mapping relationship between the index of the receive antenna, the forwarding pattern, and the fourth bit; and the fourth mapping relationship is obtained through calculation in each target area.

It should be noted that in this embodiment of this application, the first target area includes one or more areas in the plurality of areas after the division of the array of assistance nodes.

An example in which the forwarding pattern is a forwarding-phase pattern and the first target area is one of the plurality of areas after the division of the array of assistance nodes is used in combination with a specific implementation below to describe the hybrid modulation manner in Manner 2 with examples.

Figure 6:
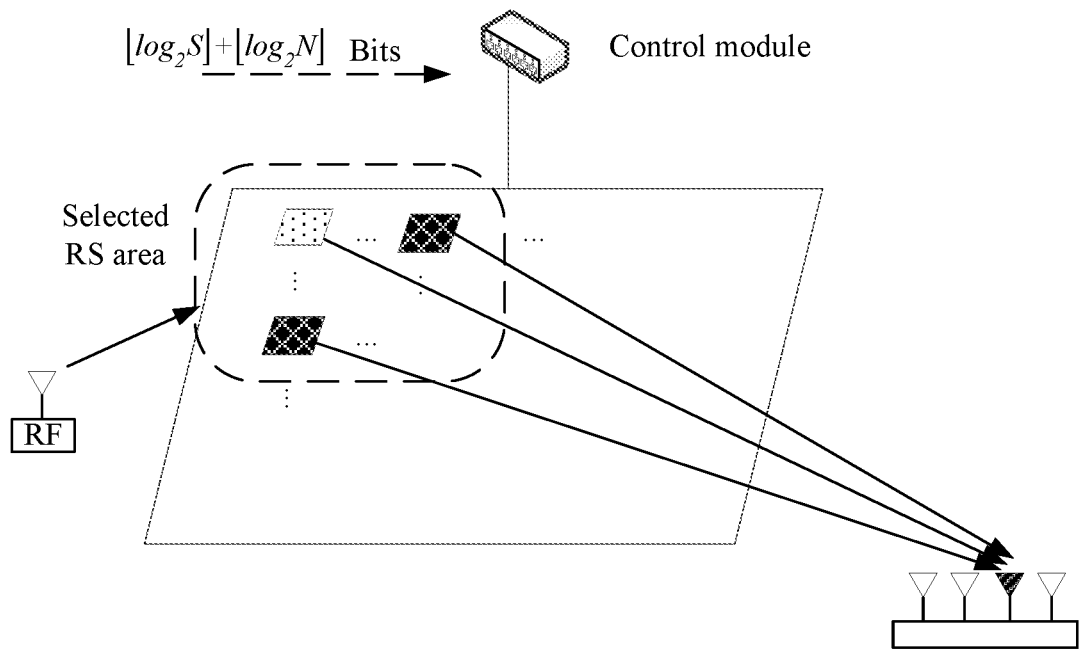
FIG. 6 is a second schematic diagram of MS-based hybrid index modulation according to an embodiment of this application.

In conjunction with FIG. 6, a process of the hybrid index modulation in this specific implementation may be: in a case in which a quantity of antennas of a receiver is limited, for example, in downlink, a terminal is used as the receiver, with a limited quantity of bits that can be carried in spatial modulation, different RIS reflective or transmissive units may be activated to implement spatial modulation of a higher order. As shown in FIG. 6, an MS array is divided into S areas, where each area includes Ns reflective units, and one area is activated each time. Another implementation is to use S independent MS arrays, one of which is selected to be activated each time. This can also implement index modulation of bit information $\lfloor \log_2 S \rfloor$ Bit information $\lfloor \log_2 S \rfloor + \lfloor \log_2 N \rfloor$ is divided into two parts, where the bit information $\lfloor \log_2 S \rfloor$ is used for index modulation based on different activated RIS areas, and the bit information $\lfloor \log_2 N \rfloor$ is used for index modulation based on different antennas with a largest receive power, as described in Manner 1.

A specific process of the hybrid modulation includes two stages:

A first stage is a stage for training. To be specific, an RIS array is divided into a plurality of areas, and corresponding forwarding-phase patterns in each RIS area that maximize receive powers of different antennas of the receive end are determined.

For a passive RIS (that is not capable of receiving or detecting a signal), a set of forwarding-phase patterns are preset for each RIS area based on factors such as an interval arranged between RIS reflective or transmissive units, an orientation of the receiver, and a quantity of receive antennas, with the same specific solution for controlling a forwarding phase of a reflective or transmissive unit in each RIS area as that in Manner 1 and a similar solution for training a pattern in each RIS area to that in Manner 1. The receiver feeds back a pattern training result to the RIS, and the training result includes at least one of the following parameters: a moment at which one pattern and a combination of activated RIS areas appear, an index of a corresponding reference signal, a signal strength of a corresponding received signal, an index of a corresponding receive antenna, or another parameter indicating a correspondence relationship between a pattern, an activated RIS area, and an index of a receive antenna.

In addition, for an active RIS (that is capable of receiving and detecting a signal), the receiver transmits a measurement signal, and the RIS determines channel state information based on a detection result, and further calculates, for each RIS area, to obtain a forwarding-phase pattern that maximizes receive powers of different antennas of the receiver.

After the training is completed, the transmit end or the intelligent surface further needs to send information to the receive end, and the information indicates a quantity of parameter combinations needed for transmission and forwarding in a subsequent stage of communication, a correspondence relationship between corresponding bit information, a quantity of bits carried in phase modulation, and a manner of modulating.

A second stage is a stage for sending. To be specific, a transmitted bitstream is divided into two parts. One part of bits is used to determine an activated RIS area, where for example, the RIS is divided into two parts, an area 1 and an area 2, and 1 bit may be modulated. If a transmitted bit is 0, the area 1 is activated; or if a transmitted bit is 1, the area 2 is activated. The other part of bits is used to determine a forwarding-phase pattern of a selected RIS area, for index modulation based on largest powers of different receive antennas, and a manner of the index modulation is similar to Manner 1.

Further, phase modulation may be implemented by adjusting, in a unified manner, forwarding patterns of different reflective units in each forwarding-phase pattern of the selected activated RIS area. That is, after the activated RIS area and the forwarding-phase pattern is determined, a same way of phase value adjustment, for example, BPSK modulation, is performed, by using the other part of bits, based on the current forwarding-phase pattern, on all forwarding phases in the pattern. All the forwarding phases in the pattern may undergo a 0/pi flip according to Table 2, and in this case, a relationship between strengths of powers of different antennas of the receiver for receiving signals remains unchanged.

An example in which the forwarding pattern is a forwarding-phase pattern and the first target area is a plurality of areas in the plurality of areas after the division of the array of assistance nodes is used in combination with a specific implementation below to describe the hybrid modulation manner in Manner 2 with examples.

Figure 7:
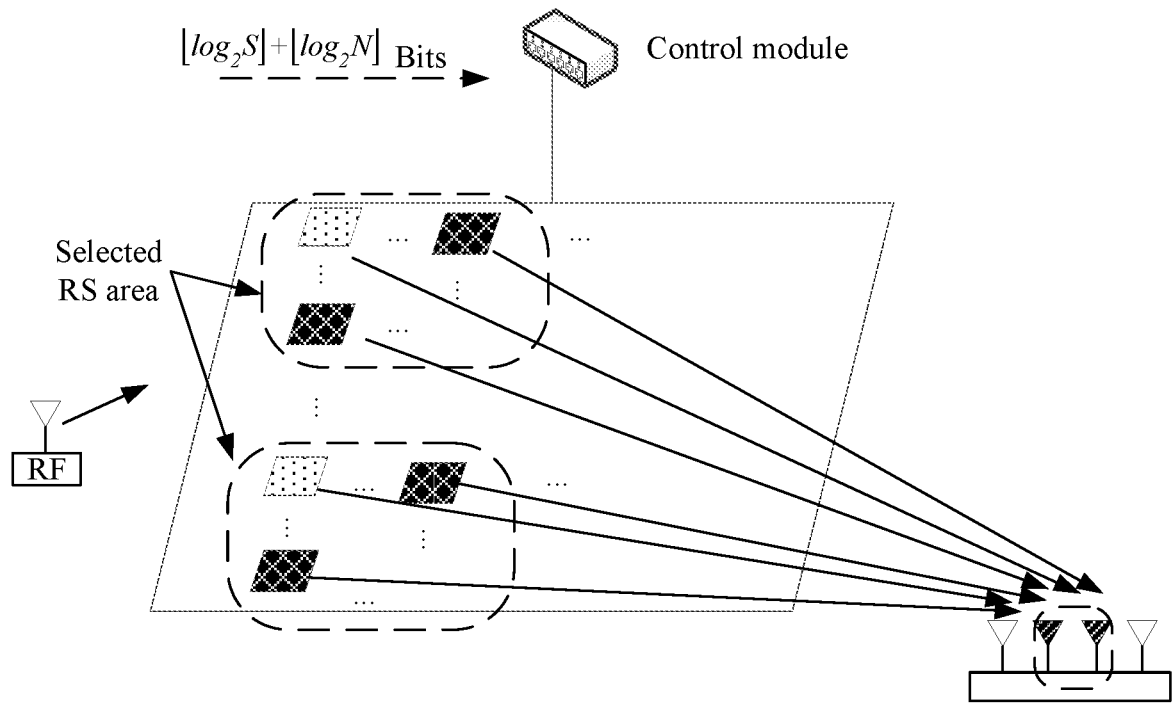
FIG. 7 is a third schematic diagram of RIS-based hybrid index modulation according to an embodiment of this application.

In conjunction with FIG. 7, a process of the hybrid index modulation in this specific implementation may be: a plurality of activated RIS areas are selected each time, to implement index modulation of a higher order based on different combinations of the activated RIS areas, and similarly, a plurality of receive antennas are selected each time when an RIS forwarding-phase pattern is trained, where a power of a received signal on these antennas is higher than that of another antenna, to implement index modulation of a higher order based on different combinations of the receive antennas. As shown in FIG. 7, an RIS array is divided into S areas, where each area includes Ns reflective units, and u areas are activated each time, to implement index modulation of bit information $\lfloor \log_2 C_S^u \rfloor$. Another implementation is to use S different MS arrays, u arrays of which are selected each time. This can also implement index modulation of the bit information $\lfloor \log_2 C_S^u \rfloor$. Forwarding-phase patterns of the u RIS areas decide m selected antenna indices of the receive end. Bit information $\lfloor \log_2 C_S^u \rfloor + \lfloor \log_2 C_N^m \rfloor$ is divided into two parts, where the bit information $\lfloor \log_2 C_N^m \rfloor$ is used for index modulation based on different receive antennas, and the bit information $\lfloor \log_2 C_S^u \rfloor$ is used for index modulation based on different activated RIS areas.

A specific process of the hybrid modulation includes two stages:

A first stage is a stage for training. To be specific, an RIS is divided into a plurality of areas, and corresponding forwarding-phase patterns in different combinations of the RIS areas that bring higher receive powers of a plurality of antennas of the receive end than that of another antenna are determined.

For example, an RIS array is divided into six areas, an area 1 to an area 6, two of which are selected to be activated each time, and there are $C_6^2=15$ combinations, so that three bits can be modulated. If according to Manner 2, only one area is selected each time, there are six cases, and two bits can be modulated. Therefore, with same hardware, compared with a conventional technology, the modulation manner in the embodiments of this application has higher efficiency of modulation.

In addition, a correspondence relationship between a bit and a combination of activated RIS areas is shown in Table 3.

TABLE 3

| Transmitted bit | Combination of indices of activated RIS areas |
| --- | --- |
| 000 | 1, 2 |
| 001 | 1, 3 |
| 011 | 1, 4 |
| 010 | 2, 4 |
| 110 | 3, 4 |
| 111 | 3, 5 |
| 101 | 4, 6 |
| 100 | 5, 6 |

For a passive RIS (that is not capable of receiving or detecting a signal), according to Table 3, a set of forwarding-phase patterns are preset for each combination of activated RIS areas based on factors such as an interval arranged between RIS reflective or transmissive units, an orientation of the receiver, and a quantity of receive antennas, with the same specific process of controlling a forwarding phase of a reflective or transmissive unit in each combination of activated RIS areas as that in Manner 1.

According to Table 3, a pattern may be trained for each combination of activated RIS areas. The transmit end transmits a single-frequency carrier signal that arrives at the receive end after being reflected or transmitted by the RIS. The RIS side traverses, based on a preset set of forwarding-phase patterns, forwarding-phase patterns in the set in a manner of time division. The receiver detects receive powers of different antennas in a same time unit to determine indices of a plurality of receive antennas with largest receive antenna powers and a corresponding forwarding-phase pattern. For example, the receiver has six receive antennas, powers of two of the receive antennas are selected each time to be maximized, and there are $C_6^2=15$ combinations, so that three bits can be modulated. If according to Manner 1 or Manner 2, a power of only one receive antenna is selected each time to be maximized, and there are six cases, so that two bits can be modulated. With same hardware, there is higher efficiency of modulation in the embodiments of this application. The receiver feeds back a pattern training result to the RIS, and the training result includes at least one of the following parameters: a moment at which one pattern and a plurality of combinations of activated RIS areas appear, an index of a corresponding reference signal, a signal strength of a corresponding received signal, an index of a corresponding receive antenna, or another parameter indicating a correspondence relationship between a pattern, an activated RIS area, and an index of a receive antenna.

In addition, for an active RIS (that is capable of receiving and detecting a signal), the receiver transmits a measurement signal, and the RIS determines channel state information based on a detection result, and further calculates, for each RIS area, to obtain a forwarding-phase pattern that maximizes receive powers of a plurality of different antennas of the receiver.

A combination of indices of receive antennas and a corresponding forwarding-phase pattern are recorded to represent a specific transmitted bit, which is shown specifically in Table 4.

TABLE 4

| Bit | Combination of indices of receive antennas with largest receive powers | Phase pattern corresponding to the combination of the indices of the receive antennas with the largest receive powers |
|---|---|---|
| 000 | 1, 2 | 1 |
| 001 | 1, 3 | 2 |
| 011 | 1, 4 | 3 |
| 010 | 2, 4 | 4 |
| 110 | 3, 4 | 5 |
| 111 | 3, 5 | 6 |
| 101 | 4, 6 | 7 |
| 100 | 5, 6 | 8 |

After the training stage is completed, the transmit end or the intelligent surface sends information to the receive end, and the information indicates a quantity of parameter combinations needed for transmission and forwarding in a subsequent stage of communication, a correspondence relationship between corresponding bit information, a quantity of bits carried in phase modulation, and a manner of modulating.

A second stage is a stage for sending. A transmitted bitstream is divided into two parts, where one part of bits is used to determine a combination of activated RIS areas. For example, according to Table 3, a bit is mapped to a combination of indices of activated RIS areas, to implement index modulation based on a plurality of different activated RIS areas. The other part of bits is used to determine, according to Table 4, a forwarding-phase pattern of a selected combination of activated RIS areas, for index modulation based on largest powers of a plurality of different receive antennas.

Further, phase modulation may be implemented by adjusting, in a unified manner, determined forwarding patterns of different reflective units in each forwarding-phase pattern of the selected combination of activated RIS areas. That is, after the combination of activated RIS areas and the forwarding-phase pattern is determined, a same way of phase value adjustment, for example, BPSK modulation, is performed, by using the other part of bits, based on the current forwarding-phase pattern, on all forwarding phases in the pattern. All the forwarding phases in the pattern may undergo a 0/pi flip according to Table 2, and in this case, a relationship between strengths of powers of different antennas of the receiver for receiving signals remains unchanged.

Manner 3: The determining, based on a bit in the bitstream and a mapping relationship, a forwarding pattern and a manner of modulating a forwarding phase in the forwarding pattern in step 404 may further include:

step 404-31: determining the index of the transmit antenna based on a sixth bit in the bitstream and a sixth mapping relationship, where the sixth mapping relationship is used to indicate a mapping relationship between the index of the transmit antenna and the sixth bit; and a power of the transmit antenna is greater than or equal to a third preset threshold;

step 404-32: determining, by using the determined index of the transmit antenna, an index of a second target area based on a seventh bit in the bitstream and a seventh mapping relationship, where the seventh mapping relationship is used to indicate a mapping relationship between the seventh bit and the index of the second target area; and the second target area is an area in a plurality of areas after the division of the array of assistance nodes; and step 404-33: modulating the forwarding phase in the forwarding pattern corresponding to the second target area based on an eighth bit in the bitstream and an eighth mapping relationship, where the eighth mapping relationship is used to indicate a mapping relationship between the eighth bit and the manner of modulating a phase value.

Figure 8:
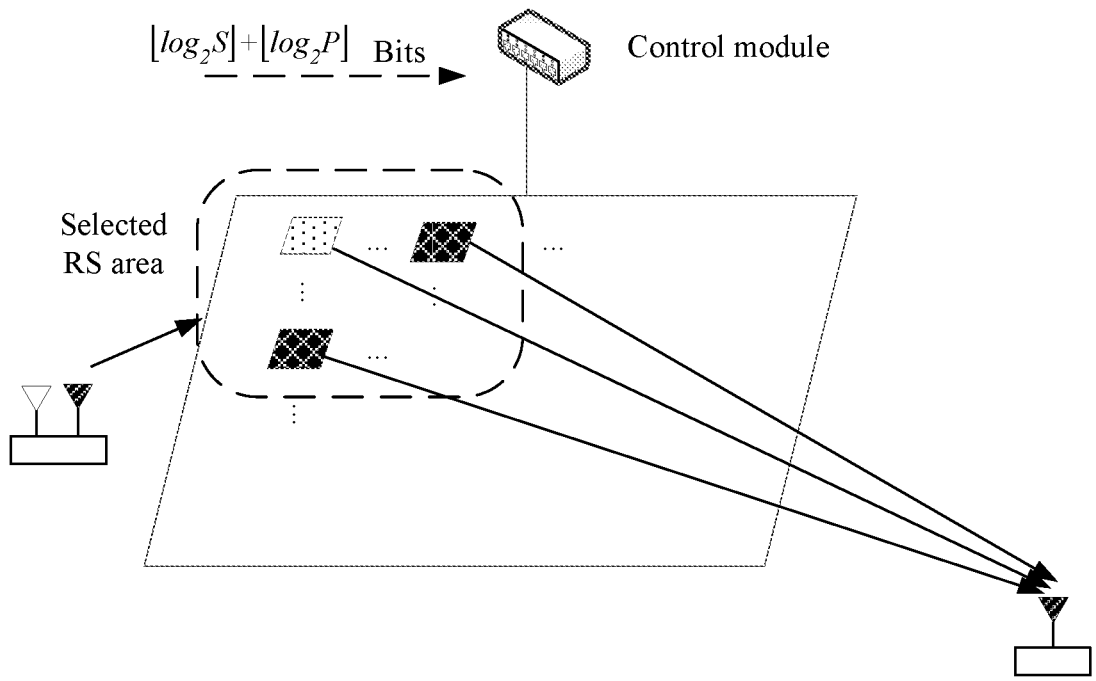
FIG. 8 is a fourth schematic diagram of RIS-based hybrid index modulation according to an embodiment of this application.

An example in which the forwarding pattern is a forwarding-phase pattern is used below to describe the hybrid modulation manner in Manner 3 with examples in combination with a specific implementation. In conjunction with FIG. 8, a process of the hybrid index modulation in this specific implementation may be: dividing an RIS array into S areas, where each area includes Ns reflective units, and one area is activated each time, to implement index modulation of bit information $\lfloor \log_2 S \rfloor$ Another implementation is to use S independent RIS arrays, one of which is selected to be activated each time. This can also implement index modulation of the bit information $\lfloor \log_2 S \rfloor$ The bitstream $\lfloor \log_2 S \rfloor + \lfloor \log_2 P \rfloor$ is divided into two parts, where the bit information $\lfloor \log_2 S \rfloor$ is used for index modulation based on different activated RIS areas, the bit information $\lfloor \log_2 P \rfloor$ is used for index modulation based on different transmit antennas, and P represents a quantity of transmit antennas.

A specific manner of the hybrid modulation is: first, dividing a transmitted bitstream into two parts, where one part of bits is used to determine an activated RIS area, where for example, the RIS is divided into two parts, an area 1 and an area 2. If a transmitted bit is 0, the area 1 is activated; or if a transmitted bit is 1, the area 2 is activated. The other part of bits is used to determine the index of the selected transmit antenna. For example, the transmitter has two transmit antennas that may have different positions or different polarization directions and are denoted as an antenna 1 and an antenna 2. If a transmitted bit is 0, the antenna 1 is used for sending; or if a transmitted bit is 1, the antenna 2 is used for sending. A relationship between a transmitted bit, an index of a transmit antenna, and an activated RIS area is shown in Table 5.

TABLE 5

| Transmitted bit | Index of a transmit antenna | Index of an activated RIS area |
|---|---|---|
| 00 | 1 | 1 |
| 01 | 1 | 2 |
| 11 | 2 | 1 |
| 10 | 2 | 2 |

Before official communication, the transmit end or the intelligent surface sends information to the receive end, and the information indicates a quantity of parameter combinations needed for transmission and forwarding in a subsequent stage of communication, a correspondence relationship between corresponding bit information, a quantity of bits carried in phase modulation, and a manner of modulating.

Further, a combination of indices of a plurality of different transmit antennas may be selected, that is, v of P transmit antennas are selected, and bit information $\lfloor \log_2 C_P^v \rfloor$ can be modulated. Similarly, an RIS array is divided into S areas, where each area includes Ns reflective units, and u areas are activated each time, to implement modulation of the bit information $\lfloor \log_2 C_S^u \rfloor$ in a manner similar to Manner 2.

Further, after a transmit antenna and an activated RIS area are selected, forwarding patterns of different reflective units in the activated RIS area may be adjusted, in a unified manner, to implement phase modulation, for example, BPSK modulation. All the forwarding phases in the activated RIS area may undergo a 0/pi flip according to Table 2.

Manner 4: The determining, based on a bit in the bitstream and a mapping relationship, a forwarding pattern and a manner of modulating a forwarding phase in the forwarding pattern in step S404 may further include:

step 404-41: determining the index of the transmit antenna based on a ninth bit in the bitstream and a ninth mapping relationship, where the ninth mapping relationship is used to indicate a mapping relationship between the index of the transmit antenna and the ninth bit; and a power of the transmit antenna is greater than or equal to a fourth preset threshold;

step 404-42: determining, by using the index of the transmit antenna, the forwarding pattern based on a tenth bit in the bitstream and a tenth mapping relationship, where the tenth mapping relationship is used to indicate a mapping relationship between the tenth bit, the index of the receive antenna, and a forwarding pattern corresponding to the index of the receive antenna; and a power of the receive antenna is greater than or equal to a fifth preset threshold; and step 404-43: modulating the forwarding phase in the determined forwarding pattern based on an eleventh bit in the bitstream and an eleventh mapping relationship, where the eleventh mapping relationship is used to indicate a mapping relationship between the eleventh bit and the manner of modulating a phase value.

Before step 402 in this embodiment of this application of obtaining the bitstream to be transmitted between the first communications device and the second communications device, the tenth mapping relationship may be obtained in one of the following manners:

1) dividing the array of assistance nodes into the plurality of areas, and training the forwarding pattern based on a radio signal sent by the first communications device to the second communications device to obtain a training result, where the training result includes: the tenth mapping relationship, obtained based on the index of the transmit antenna, between the index of the receive antenna, the forwarding pattern, and the tenth bit; and 2) receiving a measurement signal sent by the second communications device, and calculating the measurement signal to obtain a calculation result, where the calculation result includes: the tenth mapping relationship, obtained based on the index of the transmit antenna, between the index of the receive antenna, the forwarding pattern, and the tenth bit.

Figure 9:
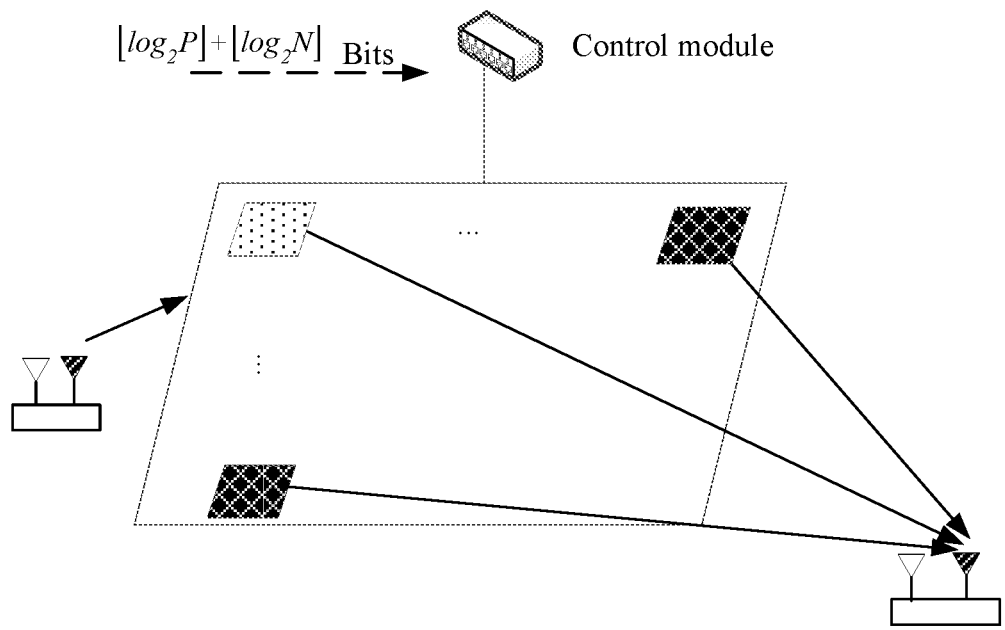
FIG. 9 is a fifth schematic diagram of RIS-based hybrid index modulation according to an embodiment of this application.

An example in which the forwarding pattern is a forwarding-phase pattern is used below to describe the hybrid modulation manner in Manner 4 with examples in combination with a specific implementation. In conjunction with FIG. 9, a process of the hybrid index modulation in this specific implementation may be: dividing a bitstream $\lfloor \log_2 P \rfloor + \lfloor \log_2 N \rfloor$ into two parts, where the bit information $\lfloor \log_2 P \rfloor$ is used for index modulation based on different transmit antennas, P represents a quantity of transmit antennas, the bit information $\lfloor \log_2 N \rfloor$ is used for spatial modulation by switching an RIS forwarding-phase pattern, and N represents a quantity of antennas of a receiver.

A specific solution of the hybrid modulation includes two stages:

A first stage is a stage for training. Corresponding RIS forwarding-phase patterns that maximize receive powers of different antennas of the receive end when different transmit antennas are selected are determined.

For a passive MS (that is not capable of receiving or detecting a signal), each transmit antenna is fixed separately, and a set of RIS forwarding-phase patterns are preset, with the same specific process of controlling a forwarding phase of an MS reflective or transmissive unit as that in Manner 1. For example, the transmitter has two transmit antennas denoted as an antenna 1 and an antenna 2, and one bit can be modulated. If a transmitted bit is 0, the antenna 1 is used for sending; or if a transmitted bit is 1, the antenna 2 is used for sending.

In a process of pattern training, a transmit end transmits a radio signal (the signal may be a single-frequency carrier signal or a reference signal in a radio system, for example, an SSB, a CSI-RS, or an SRS) that arrives at a receive end after being reflected or transmitted by the MS. The MS side traverses, based on the preset set of forwarding-phase patterns, forwarding-phase patterns in the set in a manner of time division. The receiver detects receive powers of different antennas in a same time unit to determine a receive antenna with a largest receive antenna power and a corresponding forwarding-phase pattern. For example, the receiver has two receive antennas, and in one time unit, a power of a receive antenna 1 is the largest, where a forwarding-phase pattern at this moment is denoted as a pattern 1 and used to represent a bit 0; or if a power of a receive antenna 2 is the largest, a forwarding-phase pattern at this moment is denoted as a pattern 2 and used to represent a bit 1. The receiver feeds back a pattern training result to the RIS, and the training result includes at least one of the following parameters: a moment at which one pattern and a combination of transmit antennas appear, an index of a corresponding reference signal, a signal strength of a corresponding received signal, an index of a corresponding receive antenna, or another parameter indicating a correspondence relationship between an index of a transmit antenna, a pattern, and an index of a receive antenna.

For an active RIS (that is capable of receiving and detecting a signal), the receiver transmits a measurement signal, and the RIS determines channel state information based on a detection result, and further calculates to obtain a forwarding-phase pattern that maximizes receive powers of different antennas of the receiver. In addition, a relationship between a transmitted bit, an index of a transmit antenna, and a forwarding-phase pattern is shown in Table 6.

TABLE 6

| Transmitted bit | Index of a transmit antenna | Index of a receive antenna with a largest receive power | Phase pattern corresponding to the index of the receive antenna with the largest receive power |
|---|---|---|---|
| 00 | 1 | 1 | 1 |
| 01 | 1 | 2 | 2 |
| 11 | 2 | 1 | 1 |
| 10 | 2 | 2 | 2 |

After the training is completed, the transmit end or the intelligent surface sends information to the receive end, and the information indicates a quantity of parameter combinations needed for transmission and forwarding in a subsequent stage of communication, a correspondence relationship between corresponding bit information, a quantity of bits carried in phase modulation, and a manner of modulating.

A second stage is a stage for sending. To be specific, a transmitted bitstream is divided into two parts. As shown in Table 6, one part of bits is used to determine an index of a selected transmit antenna. A remaining part of bits is used to determine an RIS forwarding-phase pattern, for index modulation based on largest powers of different receive antennas.

Further, a combination of indices of a plurality of different transmit antennas may be selected, that is, v of P transmit antennas are selected to be activated, and bit information $\lfloor \log_2 C_P^v \rfloor$ can be modulated. Similarly, m receive antennas are selected each time from N receive antennas when an RIS forwarding-phase pattern is trained, where a power of a received signal on these antennas is higher than that of another antenna, such that a manner of modulating the bit information $\lfloor \log_2 C_N^m \rfloor$ is similar to Manner 2 in which there are a plurality of first target areas.

Further, after a transmit antenna and a corresponding forwarding-phase pattern are selected, forwarding patterns of different reflective units in each RIS forwarding-phase pattern are adjusted, in a unified manner, to implement phase modulation, for example, BPSK modulation. All the forwarding phases in the activated RIS area undergo a 0/pi flip according to Table 2.

Manner 5: The determining, based on a bit in the bitstream and a mapping relationship, a forwarding pattern and a manner of modulating a forwarding phase in the forwarding pattern in step 404 may further include:

step 404-51: determining, based on a twelfth bit in the bitstream and a twelfth mapping relationship, an index of a third target area, where the twelfth mapping relationship is used to indicate a mapping relationship between the index of the third target area and the twelfth bit, and the third target area is an area in a plurality of areas after the division of the array of assistance nodes;

step 404-52: determining the index of the transmit antenna based on a thirteenth bit in the bitstream and a thirteenth mapping relationship, where the thirteenth mapping relationship is used to indicate a mapping relationship between the index of the transmit antenna and the thirteenth bit; and a power of the transmit antenna is greater than or equal to a sixth preset threshold; and step 404-53: determining, by using the index of the third target area and the index of the transmit antenna, the forwarding pattern based on a fourteenth bit in the bitstream and a fourteenth mapping relationship, where the fourteenth mapping relationship is used to indicate a mapping relationship between the fourteenth bit, the index of the receive antenna, and a forwarding pattern corresponding to the index of the receive antenna; and a power of the receive antenna is greater than or equal to a seventh preset threshold; and step 404-54: modulating the forwarding phase in the determined forwarding pattern based on a fifteenth bit in the bitstream and a fifteenth mapping relationship, where the fifteenth mapping relationship is used to indicate a mapping relationship between the fifteenth bit and the manner of modulating a phase value.

Before step 402 in this embodiment of this application of obtaining the bitstream to be transmitted between the first communications device and the second communications device, the fourteenth mapping relationship may be obtained in one of the following manners:

1) dividing the array of assistance nodes into the plurality of areas, and training the forwarding pattern based on a radio signal sent by the first communications device to the second communications device to obtain a training result, where the training result includes: the fourteenth mapping relationship, obtained based on the index of third target area and the index of the transmit antenna, between the fourteenth bit, the index of the receive antenna, a forwarding pattern corresponding to the index of the receive antenna; and 2) receiving a measurement signal sent by the second communications device, and calculating the measurement signal to obtain a calculation result, where the calculation result includes: the fourteenth mapping relationship, obtained based on the index of third target area and the index of the transmit antenna, between the fourteenth bit, the index of the receive antenna, a forwarding pattern corresponding to the index of the receive antenna.

Figure 10:
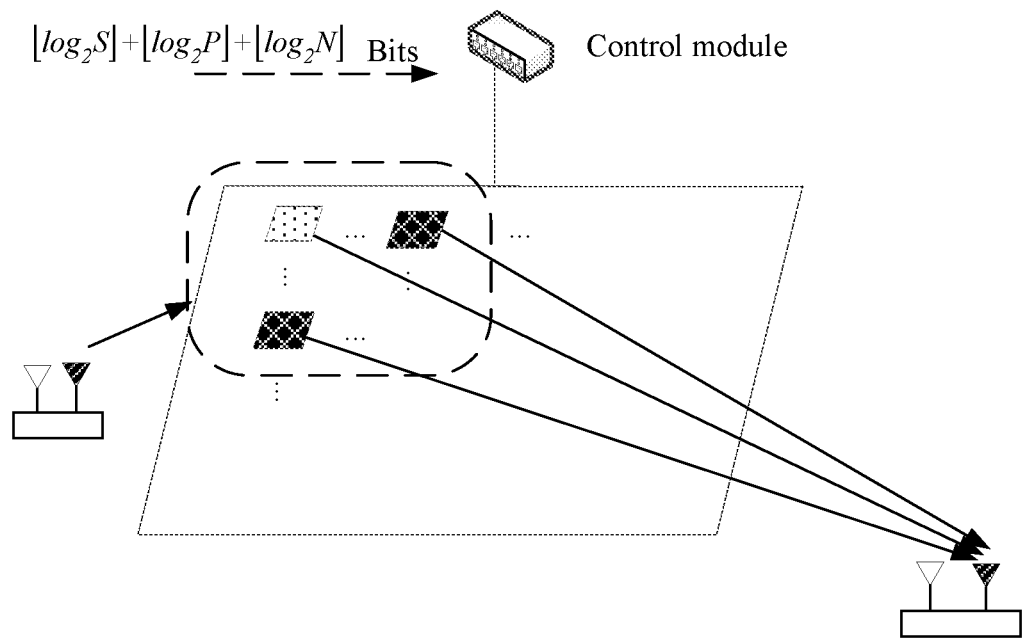
FIG. 10 is a sixth schematic diagram of RIS-based hybrid index modulation according to an embodiment of this application.

An example in which the forwarding pattern is a forwarding-phase pattern is used below to describe the hybrid modulation manner in Manner 5 with examples in combination with a specific implementation. In conjunction with FIG. 10, a process of the hybrid index modulation in this specific implementation may be: dividing an RIS array into S areas, where each area includes Ns reflective units, and one area is activated each time, to implement index modulation of bit information $\lfloor \log_2 S \rfloor$ Another implementation is to use S independent RIS arrays, one of which is selected to be activated each time. This can also implement index modulation of the bit information $\lfloor \log_2 S \rfloor$ A bitstream $\lfloor \log_2 S \rfloor + \lfloor \log_2 P \rfloor + \lfloor \log_2 N \rfloor$ is divided into three parts, where the bit information $\lfloor \log_2 S \rfloor$ is used for index modulation based on different activated RIS areas, the bit information $\lfloor \log_2 P \rfloor$ is used for index modulation based on different transmit antennas, P represents a quantity of transmit antennas, the bit information $\lfloor \log_2 N \rfloor$ is used for spatial modulation by switching an RIS forwarding-phase pattern, and N represents a quantity of antennas of a receiver.

A specific manner of the hybrid modulation includes two stages:

A first stage is a stage for training. An RIS array is divided into a plurality of areas. Corresponding forwarding-phase patterns of each RIS area that maximize receive powers of different antennas of the receive end when different transmit antennas are selected are determined.

For a passive RIS (that is not capable of receiving or detecting a signal), each transmit antenna is fixed separately, and a set of RIS forwarding-phase patterns are preset for each RIS area, with the same specific process of controlling a forwarding phase of a reflective or transmissive unit in each RIS area as that in Manner 1 and a similar process of training a pattern in each RIS area to that in Manner 4.

For example, the transmitter has two transmit antennas denoted as a transmit antenna 1 and a transmit antenna 2, and one bit can be modulated. If a transmitted bit is 0, the antenna 1 is used for sending; or if a transmitted bit is 1, the antenna 2 is used for sending. The RIS is divided into two parts, an area 1 and an area 2. If a transmitted bit is 0, the area 1 is activated; or if a transmitted bit is 1, the area 2 is activated. The receiver has two receive antennas, and in one time unit, a power of a receive antenna 1 is the largest, where a forwarding-phase pattern at this moment is denoted as a pattern 1 and used to represent a bit 0; or if a power of a receive antenna 2 is the largest, a forwarding-phase pattern at this moment is denoted as a pattern 2 and used to represent a bit 1. The receiver feeds back a pattern training result to the RIS, and the training result includes at least one of the following parameters: a moment at which one pattern, a transmit antenna, and a combination of activated RIS areas appear, an index of a corresponding reference signal, a signal strength of a corresponding received signal, an index of a corresponding receive antenna, or another parameter indicating a correspondence relationship between an index of a transmit antenna, an activated MS area, a pattern, and an index of a receive antenna.

In addition, for an active MS (that is capable of receiving and detecting a signal), the receiver transmits a measurement signal, and the RIS determines channel state information based on a detection result, and further calculates to obtain a forwarding-phase pattern of each MS area that maximizes receive powers of different antennas of the receiver. A relationship between a transmitted bit, an index of a transmit antenna, an activated RIS area, and a forwarding-phase pattern is shown in Table 7.

TABLE 7

| Transmitted bit | Index of a transmit antenna | Index of an activated RIS area | Index of a receive antenna with a largest receive power | Phase pattern corresponding to the index of the receive antenna with the largest receive power |
|---|---|---|---|---|
| 000 | 1 | 1 | 1 | 1 |
| 001 | 1 | 1 | 2 | 2 |
| 011 | 1 | 2 | 1 | 1 |
| 010 | 1 | 2 | 2 | 2 |
| 110 | 2 | 1 | 1 | 1 |
| 111 | 2 | 1 | 2 | 2 |
| 101 | 2 | 2 | 1 | 1 |
| 100 | 2 | 2 | 2 | 2 |

After the training process is completed, the transmit end or the intelligent surface sends information to the receive end, and the information indicates a quantity of parameter combinations needed for transmission and forwarding in a subsequent stage of communication, a correspondence relationship between corresponding bit information, a quantity of bits carried in phase modulation, and a manner of modulating.

A second stage is a stage for sending. A transmitted bitstream is divided into three parts. According to Table 6, a part of bits is used to determine an activated RIS area. Another part of bits is used to determine an index of a selected transmit antenna. A remaining part of bits is used to determine a forwarding-phase pattern in a selected RIS area, for index modulation based on largest powers of different receive antennas.

Further, a combination of indices of a plurality of different transmit antennas may be selected, that is, v of P transmit antennas are selected to be activated, and bit information $\lfloor \log_2 C_P^v \rfloor$ can be modulated. Similarly, an RIS array is divided into S areas, where each area includes Ns reflective units, and u areas are activated each time, to implement modulation of the bit information $\lfloor \log_2 C_S^u \rfloor$ in a manner similar to Manner 2 in which there are a plurality of first target areas. Similarly, m receive antennas are selected each time from N receive antennas when an RIS forwarding-phase pattern is trained, where a power of a received signal on these antennas is higher than that of another antenna, such that a manner of modulating the bit information $\lfloor \log_2 C_N^m \rfloor$ is similar to Manner 2 in which there are a plurality of first target areas.

Further, after a transmit antenna, an activated RIS area, and a corresponding forwarding-phase pattern are selected, forwarding patterns of different reflective units in each RIS forwarding-phase pattern of the selected activated RIS area are adjusted, in a unified manner, to implement phase modulation, for example, BPSK modulation. All the forwarding phases in the activated RIS area may undergo a 0/pi flip according to Table 2.

Clearly, in Manner 1 to Manner 5 in the embodiments of this application, the RIS can be used for signal phase control to implement phase modulation and spatial modulation. That is, the embodiments of this application can not only improve efficiency of modulation, but also has a lower requirement on a radio frequency link component of a transmit end, such that a transmitter architecture is simpler, and energy efficiency and frequency spectrum efficiency of a communications system are improved.

It should be noted that, the modulation method provided in the embodiments of this application may be performed by a modulation apparatus or a control module that is in the modulation apparatus and that is configured to perform the modulation method. In an embodiment of this application, the modulation apparatus provided in the embodiments of this application is described by using an example in which the modulation method is performed by the modulation apparatus.

Figure 11:
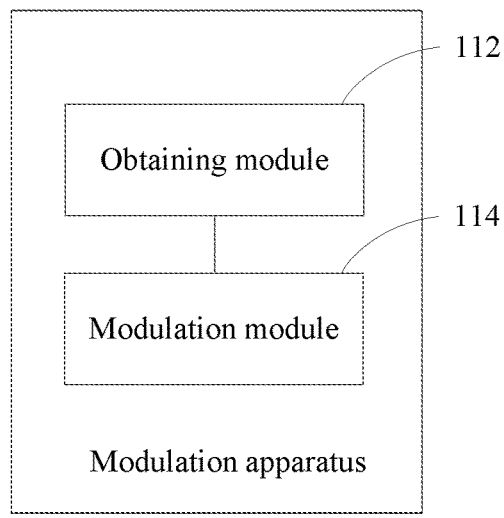
FIG. 11 is a schematic structural diagram of a modulation apparatus according to an embodiment of this application.

An embodiment of this application provides a modulation apparatus. FIG. 11 is a schematic structural diagram of the modulation apparatus according to this embodiment of this application. As shown in FIG. 11, the apparatus includes:

an obtaining module 112, configured to obtain a bitstream to be transmitted; and a modulation module 114, configured to determine, based on a bit in the bitstream and a mapping relationship, a forwarding pattern and a manner of modulating a forwarding phase in the forwarding pattern, where the mapping relationship is used to indicate a mapping relationship between the bit, the forwarding pattern, and a target index, and is used to indicate a mapping relationship between the bit and the phase modulation manner; and the target index includes at least one of the following: an index of a transmit antenna, an index of a receive antenna, and an index of an area after division of an array of assistance nodes.

By using the apparatus in this embodiment of this application, spatial modulation can be implemented by determining, based on a bit in a bitstream to be transmitted and a mapping relationship, a forwarding pattern, and phase modulation can be implemented in a manner of modulating a forwarding phase in the forwarding pattern based on the bit and the mapping relationship; and because the mapping relationship is used to indicate a mapping relationship between the bit, the forwarding pattern, and a target index, the target index includes at least one of the following: an index of a transmit antenna, an index of a receive antenna, and an index of an area after division of an array of assistance nodes; that is, during spatial modulation, modulation is not performed merely based on an index of a receive antenna, but a combination of an index of a receive antenna, an index of a transmit antenna, an index of an area after division of an array of assistance nodes is used for spatial modulation of a higher order. Clearly, the embodiments of this application can not only implement spatial modulation and phase modulation at the same time, but also implement spatial modulation of a higher order than that in a conventional technology, thereby solving the problem that performing spatial modulation merely by maximizing a power of one receive antenna by adjusting an RIS forwarding phase brings low efficiency of modulation, and thus improving efficiency of modulation.

Optionally, the modulation module 114 in this embodiment of this application may further include: a first modulation unit, configured to determine the forwarding pattern based on a first bit in the bitstream and a first mapping relationship, where the first mapping relationship is used to indicate a mapping relationship between the first bit, the index of the receive antenna, and a forwarding pattern corresponding to the index of the receive antenna; and a power of the receive antenna is greater than or equal to a first preset threshold; and a second modulation unit, configured to modulate the forwarding phase in the forwarding pattern based on a second bit in the bitstream and a second mapping relationship, where the second mapping relationship is used to indicate a mapping relationship between the second bit and the manner of modulating a phase value.

Optionally, the apparatus in this embodiment of this application may further include: a first processing module, configured to: before the bitstream to be transmitted is obtained, train the forwarding pattern based on a radio signal sent to a second communications device to obtain a training result, where the training result includes: the first mapping relationship between the index of the receive antenna, the forwarding pattern, and the first bit; or a second processing module, configured to: receive a measurement signal sent by the second communications device, and calculate the measurement signal to obtain a calculation result, where the calculation result includes: the first mapping relationship between the index of the receive antenna, the forwarding pattern, and the first bit.

Optionally, the modulation module 114 in this embodiment of this application may further include: a third modulation unit, configured to determine, based on a third bit in the bitstream and a third mapping relationship, an index of a first target area, where the third mapping relationship is used to indicate a mapping relationship between the index of the first target area and the third bit, and the first target area is an area in a plurality of areas after the division of the array of assistance nodes; a fourth modulation unit, configured to determine, by using the index of the first target area, the forwarding pattern based on a fourth bit in the bitstream and a fourth mapping relationship, where the fourth mapping relationship is used to indicate a mapping relationship between the fourth bit, the index of the receive antenna, and a forwarding pattern corresponding to the index of the receive antenna; and a power of the receive antenna is greater than or equal to a second preset threshold; and a fifth modulation unit, configured to modulate the forwarding phase in the determined forwarding pattern based on a fifth bit in the bitstream and a fifth mapping relationship, where the fifth mapping relationship is used to indicate a mapping relationship between the fifth bit and the manner of modulating a phase value.

Optionally, the apparatus in this embodiment of this application may further include: a third processing module, configured to: before the bitstream to be transmitted with a second communications device is obtained, divide the array of assistance nodes into the plurality of areas, and train the forwarding pattern based on a radio signal sent by the first communications device to the second communications device to obtain a training result, where the training result includes: the fourth mapping relationship between the index of the receive antenna, the forwarding pattern, and the fourth bit; and the fourth mapping relationship is obtained through training in each target area; or a fourth processing module, configured to: before the bitstream to be transmitted with a second communications device is obtained, receive a measurement signal sent by the second communications device, and calculate the measurement signal to obtain a calculation result, where the calculation result includes: the fourth mapping relationship between the index of the receive antenna, the forwarding pattern, and the fourth bit; and the fourth mapping relationship is obtained through calculation in each target area.

Optionally, in this embodiment of this application, the first target area includes one or more areas in the plurality of areas after the division of the array of assistance nodes.

Optionally, the modulation module 114 in this embodiment of this application may further include: a sixth modulation unit, configured to determine the index of the transmit antenna based on a sixth bit in the bitstream and a sixth mapping relationship, where the sixth mapping relationship is used to indicate a mapping relationship between the index of the transmit antenna and the sixth bit; and a power of the transmit antenna is greater than or equal to a third preset threshold; a seventh modulation unit, configured to determine, by using the index of the transmit antenna, an index of a second target area based on a seventh bit in the bitstream and a seventh mapping relationship, where the seventh mapping relationship is used to indicate a mapping relationship between the seventh bit and the index of the second target area; and the second target area is an area in a plurality of areas after the division of the array of assistance nodes; and an eighth modulation unit, configured to modulate the forwarding phase in the forwarding pattern corresponding to the second target area based on an eighth bit in the bitstream and an eighth mapping relationship, where the eighth mapping relationship is used to indicate a mapping relationship between the eighth bit and the manner of modulating a phase value.

Optionally, the modulation module 114 in this embodiment of this application may further include: a ninth modulation unit, configured to determine the index of the transmit antenna based on a ninth bit in the bitstream and a ninth mapping relationship, where the ninth mapping relationship is used to indicate a mapping relationship between the index of the transmit antenna and the ninth bit; and a power of the transmit antenna is greater than or equal to a fourth preset threshold; a tenth modulation unit, configured to determine, by using the index of the transmit antenna, the forwarding pattern based on a tenth bit in the bitstream and a tenth mapping relationship, where the tenth mapping relationship is used to indicate a mapping relationship between the tenth bit, the index of the receive antenna, and a forwarding pattern corresponding to the index of the receive antenna;

and a power of the receive antenna is greater than or equal to a fifth preset threshold; and an eleventh modulation unit, configured to modulate the forwarding phase in the determined forwarding pattern based on an eleventh bit in the bitstream and an eleventh mapping relationship, where the eleventh mapping relationship is used to indicate a mapping relationship between the eleventh bit and the manner of modulating a phase value.

Optionally, the apparatus in this embodiment of this application may further include: a fifth processing module, configured to: before the bitstream to be transmitted with a second communications device is obtained, divide the array of assistance nodes into the plurality of areas, and train the forwarding pattern based on a radio signal sent by the first communications device to the second communications device to obtain a training result, where the training result includes: the tenth mapping relationship, obtained based on the index of the transmit antenna, between the index of the receive antenna, the forwarding pattern, and the tenth bit; or a sixth processing module, configured to: before the bitstream to be transmitted with a second communications device is obtained, receive a measurement signal sent by the second communications device, and calculate the measurement signal to obtain a calculation result, where the calculation result includes: the tenth mapping relationship, obtained based on the index of the transmit antenna, between the index of the receive antenna, the forwarding pattern, and the tenth bit.

Optionally, the modulation module 114 in this embodiment of this application may further include: a twelfth modulation unit, configured to determine, based on a twelfth bit in the bitstream and a twelfth mapping relationship, an index of a third target area, where the twelfth mapping relationship is used to indicate a mapping relationship between the index of the third target area and the twelfth bit, and the third target area is an area in a plurality of areas after the division of the array of assistance nodes; a thirteenth modulation unit, configured to determine the index of the transmit antenna based on a thirteenth bit in the bitstream and a thirteenth mapping relationship, where the thirteenth mapping relationship is used to indicate a mapping relationship between the index of the transmit antenna and the thirteenth bit; and a power of the transmit antenna is greater than or equal to a sixth preset threshold; a fourteenth modulation unit, configured to determine, by using the index of the third target area and the index of the transmit antenna, the forwarding pattern based on a fourteenth bit in the bitstream and a fourteenth mapping relationship, where the fourteenth mapping relationship is used to indicate a mapping relationship between the fourteenth bit, the index of the receive antenna, and a forwarding pattern corresponding to the index of the receive antenna; and a power of the receive antenna is greater than or equal to a seventh preset threshold; and a fifteenth modulation unit, configured to modulate the forwarding phase in the determined forwarding pattern based on a fifteenth bit in the bitstream and a fifteenth mapping relationship, where the fifteenth mapping relationship is used to indicate a mapping relationship between the fifteenth bit and the manner of modulating a phase value.

Optionally, the apparatus in this embodiment of this application may further include: a seventh processing module, configured to: before the bitstream to be transmitted with a second communications device is obtained, divide the array of assistance nodes into the plurality of areas, and train the forwarding pattern based on a radio signal sent to the second communications device to obtain a training result, where the training result includes: the fourteenth mapping relationship between the fourteenth bit, the index of the receive antenna, and a forwarding pattern corresponding to the index of the receive antenna that are obtained based on the index of the third target area and the index of the transmit antenna; or an eighth processing module, configured to: before the bitstream to be transmitted with a second communications device is obtained, receive a measurement signal sent by the second communications device, and calculate the measurement signal to obtain a calculation result, where the calculation result includes: the fourteenth mapping relationship between the fourteenth bit, the index of the receive antenna, and a forwarding pattern corresponding to the index of the receive antenna that are obtained based on the index of the third target area and the index of the transmit antenna.

The modulation module in this embodiment of this application may be an apparatus, or may be a component, an integrated circuit, or a chip in a terminal. The apparatus may be a mobile terminal, or a non-mobile terminal. For example, the mobile terminal may include but is not limited to the foregoing listed types of terminals 11. The non-mobile terminal may be a server, a network attached storage (NAS), a personal computer (PC), a television (TV), a teller machine, or a self-service machine. This is not specifically limited in this embodiment of this application.

The modulation apparatus in this embodiment of this application may be an apparatus with an operating system. The operating system may be an Android operating system, an iOS operating system, or another possible operating system, which is not specifically limited in the embodiments of this application.

The modulation apparatus provided in this embodiment of this application can implement the processes of the modulation method embodiment of FIG. 4, with the same technical effect achieved. To avoid repetition, details are not provided herein again.

Figure 12:
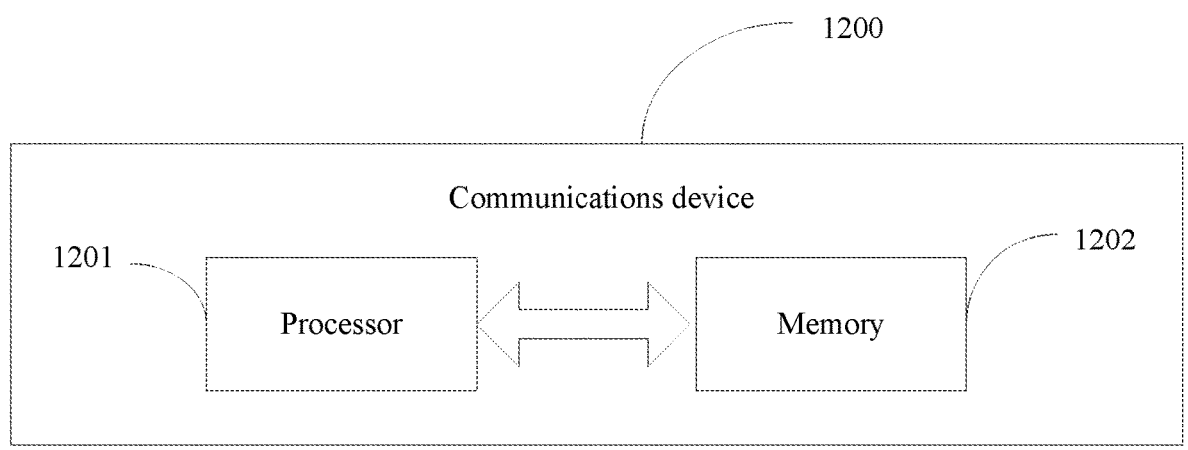
FIG. 12 is a schematic structural diagram of a communications device according to an embodiment of this application.

Optionally, as shown in FIG. 12, an embodiment of this application further provides a communications device 1200, including a processor 1201, a memory 1202, a program or an instruction stored in the memory 1202 and executable on the processor 1201. For example, when the communications device 1200 is a terminal, the program or the instruction is executed by the processor 1201 to implement the processes in the modulation method embodiment, with the same technical effect achieved. When the communications device 1200 is a network side device, when the program or the instruction is executed by the processor 1201, the processes in the modulation method embodiment are implemented, with the same technical effect achieved. To avoid repetition, details are not provided herein again.

Figure 13:
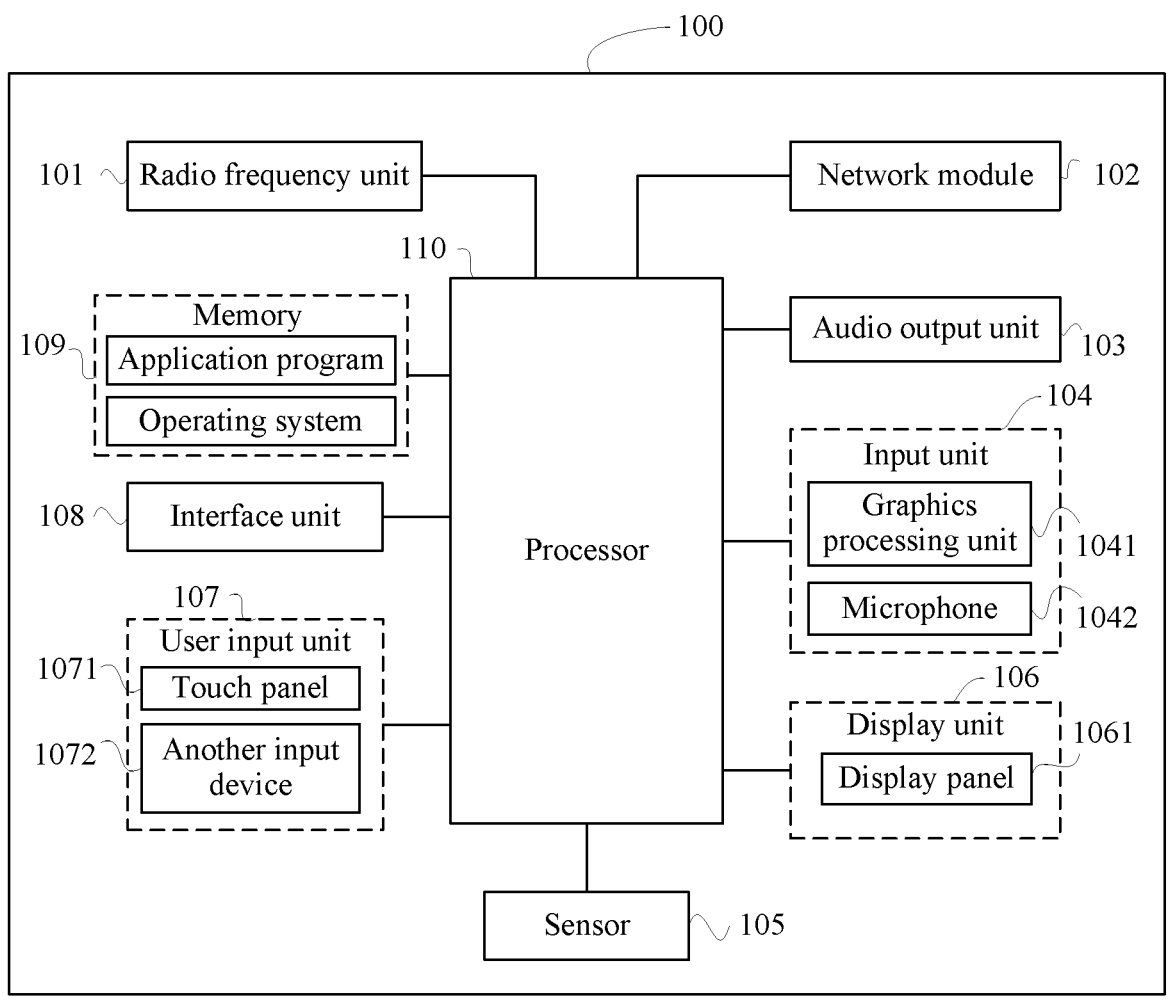
FIG. 13 is a schematic diagram of a hardware structure of a terminal according to an embodiment of this application.

FIG. 13 is a schematic diagram of a hardware structure of a terminal according to an embodiment of this application.

The terminal 100 includes but is not limited to components such as a radio frequency unit 101, a network module 102, an audio output unit 103, an input unit 104, a sensor 105, a display unit 106, a user input unit 107, an interface unit 108, a memory 109, and a processor 110.

A person skilled in the art can understand that the terminal 100 may further include a power supply (such as a battery) that supplies power to each component. The power supply may be logically connected to the processor 110 by using a power supply management system, to implement functions such as charging and discharging management, and power consumption management by using the power supply management system. The terminal structure shown in FIG. 13 constitutes no limitation on the terminal, and the terminal may include more or fewer components than those shown in the figure, or combine some components, or have different component arrangements. Details are not described herein.

It should be understood that, in this embodiment of this application, the input unit 104 may include a graphics processing unit (GPU) 1041 and a microphone 1042. The graphics processing unit 1041 processes image data of a static picture or a video obtained by an image capture apparatus (such as a camera) in a video capture mode or an image capture mode. The display unit 106 may include a display panel 1061, and the display panel 1061 may be configured in a form of a liquid crystal display, an organic light-emitting diode, or the like. The user input unit 107 includes a touch panel 1071 and another input device 1072. The touch panel 1071 is also referred to as a touchscreen. The touch panel 1071 may include two parts: a touch detection apparatus and a touch controller. The another input device 1072 may include but is not limited to a physical keyboard, a functional button (such as a volume control button or a power on/off button), a trackball, a mouse, and a joystick. Details are not described herein.

In this embodiment of this application, the radio frequency unit 101 receives downlink data from a network side device and then sends the downlink data to the processor 110 for processing; and sends uplink data to the network side device. Usually, the radio frequency unit 101 includes but is not limited to an antenna, at least one amplifier, a transceiver, a coupler, a low noise amplifier, a duplexer, and the like.

The memory 109 may be configured to store a software program or an instruction and various data. The memory 109 may mainly include a program or instruction storage area and a data storage area. The program or instruction storage area may store an operating system, and an application program or an instruction required by at least one function (for example, a sound playing function or an image playing function). In addition, the memory 109 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one disk storage component, a flash memory component, or another non-volatile solid-state storage component.

The processor 110 may include one or more processing units. Optionally, an application processor and a modem processor may be integrated into the processor 110. The application processor mainly processes an operating system, a user interface, an application program, an instruction, or the like. The modem processor mainly processes wireless communications, for example, a baseband processor. It can be understood that, alternatively, the modem processor may not be integrated into the processor 110.

The processor 110 is configured to: obtain a bitstream to be transmitted; and determine, based on a bit in the bitstream and a mapping relationship, a forwarding pattern and a manner of modulating a forwarding phase in the forwarding pattern, where the mapping relationship is used to indicate a mapping relationship between the bit, the forwarding pattern, and a target index, and is used to indicate a mapping relationship between the bit and the phase modulation manner; and the target index includes at least one of the following: an index of a transmit antenna, an index of a receive antenna, and an index of an area after division of an array of assistance nodes.

By using the terminal in this embodiment of this application, spatial modulation can be implemented by determining, based on a bit in a bitstream to be transmitted and a mapping relationship, a forwarding pattern, and phase modulation can be implemented in a manner of modulating a forwarding phase in the forwarding pattern based on the bit and the mapping relationship; and because the mapping relationship is used to indicate a mapping relationship between the bit, the forwarding pattern, and a target index, the target index includes at least one of the following: an index of a transmit antenna, an index of a receive antenna, and an index of an area after division of an array of assistance nodes; that is, during spatial modulation, modulation is not performed merely based on an index of a receive antenna, but a combination of an index of a receive antenna, an index of a transmit antenna, an index of an area after division of an array of assistance nodes is used for spatial modulation of a higher order. Clearly, the embodiments of this application can not only implement spatial modulation and phase modulation at the same time, but also implement spatial modulation of a higher order than that in a conventional technology, thereby solving the problem that performing spatial modulation merely by maximizing a power of one receive antenna by adjusting an RIS forwarding phase brings low efficiency of modulation, and thus improving efficiency of modulation.

Figure 14:
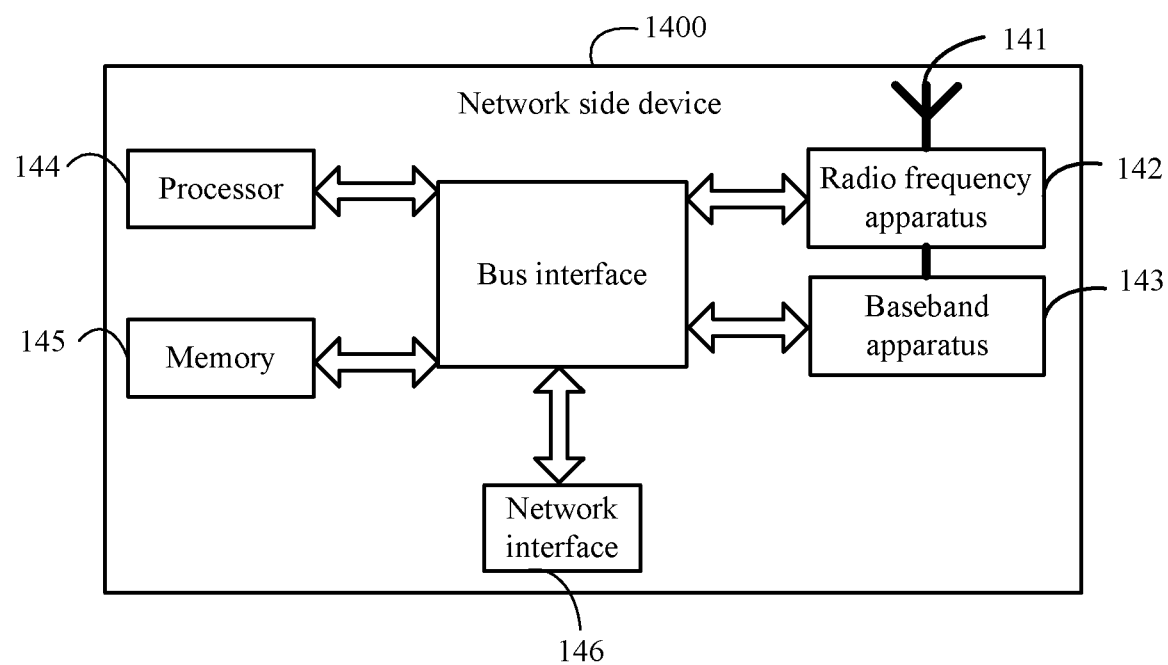
FIG. 14 is a schematic diagram of a hardware structure of a network side device according to an embodiment of this application.

Specifically, an embodiment of this application further provides a network side device. As shown in FIG. 14, a network device 1400 includes an antenna 141, a radio frequency apparatus 142, and a baseband apparatus 143. The antenna 141 is connected to the radio frequency apparatus 142. In an uplink direction, the radio frequency apparatus 142 receives information through the antenna 141, and sends the received information to the baseband apparatus 143 for processing. In a downlink direction, the baseband apparatus 143 processes information that needs to be sent, and sends processed information to the radio frequency apparatus 142. The radio frequency apparatus 142 processes received information, and sends processed information through the antenna 141.

The foregoing band processing apparatus may be located in the baseband apparatus 143, and the method performed by the network side device in the foregoing embodiment may be implemented in the baseband apparatus 143. The baseband apparatus 143 includes a processor 144 and a memory 145.

The baseband apparatus 143 may include, for example, at least one baseband board, where a plurality of chips are disposed on the baseband board. As shown in FIG. 14, one chip is, for example, the processor 144, which is connected to the memory 145, so as to invoke a program in the memory 145 to perform operations of the network device shown in the foregoing method embodiment.

The baseband apparatus 143 may further include a network interface 146, configured to exchange information with the radio frequency apparatus 142. For example, the interface is a common public radio interface (CPRI).

Specifically, the network side device in this embodiment of the present invention further includes an instruction or a program stored in the memory 145 and executable on the processor 144. The processor 144 invokes the instruction or the program in the memory 145 to perform the method performed by the modules shown in FIG. 11, with the same technical effect achieved. To avoid repetition, details are not provided herein again.

An embodiment of this application further provides a readable storage medium. The readable storage medium stores a program or an instruction, and when the program or the instruction is executed by a processor, the processes of the modulation method embodiment are implemented, with the same technical effect achieved. To avoid repetition, details are not provided herein again.

The processor is a processor in the terminal in the above embodiment. The readable storage medium includes a computer-readable storage medium such as a read-only memory (ROM), a random access memory (RAM), a magnetic disk, an optical disc, or the like.

An embodiment of this application further provides a chip. The chip includes a processor and a communications interface, the communications interfaces is coupled to the processor, and the processor is configured to run a program or an instruction of a network side device to implement the processes of the modulation method embodiment, with the same technical effect achieved. To avoid repetition, details are not provided herein again.

It should be understood that the chip mentioned in this embodiment of this application may also be referred to as a system-level chip, a system chip, a chip system, or an on-chip system chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. An element limited by "includes a . . . " does not, without more constraints, preclude the presence of additional identical elements in the process, method, article, or apparatus that includes the element. In addition, it should be noted that the scope of the methods and apparatuses in the embodiments of this application is not limited to performing functions in the order shown or discussed, but may also include performing the functions in a basically simultaneous manner or in opposite order based on the functions involved. For example, the described methods may be performed in a different order from the described order, and various steps may be added, omitted, or combined. In addition, features described with reference to some examples may be combined in other examples.

A person of ordinary skill in the art may recognize that, with reference to the examples described in the embodiments disclosed herein, units and algorithm steps may be implemented by electronic hardware or a combination of computer software and electronic hardware. Whether these functions are implemented by hardware or software depends on the specific application and design constraints of the technical solutions. A person skilled in the art may use different methods to implement the described functions for each particular application, but it should not be considered that the implementation goes beyond the scope of the present disclosure.

It may be clearly understood by a person skilled in the art that, for convenience and brevity of description, for a specific working process of the above described system, apparatus, and unit, reference may be made to a corresponding process in the above method embodiments, and details are not provided herein again.

In the embodiments provided in this application, it should be understood that the disclosed apparatus and method may be implemented in another manner. For example, the described apparatus embodiment is merely an example. For example, division into the units is merely logical function division. In actual implementation, there may be another manner of division. For example, a plurality of units or components may be combined or integrated into another system, or some features may be ignored or not performed. In addition, the displayed or discussed mutual couplings or direct couplings or communications connections may be implemented through some interfaces. The indirect couplings or communications connections between the apparatuses or units may be implemented in electronic, mechanical, or other forms.

The units described as separate parts may or may not be physically separate, and parts displayed as units may or may not be physical units, may be located in one place, or may be distributed on a plurality of network units. Some or all of the units may be selected based on an actual requirement to implement the objectives of the solutions in the embodiments.

In addition, functional units in the embodiments of the present disclosure may be integrated into one processing unit, or each of the units may exist alone physically, or two or more units are integrated into one unit.

Based on the descriptions of the foregoing implementation manners, a person skilled in the art may clearly understand that the method in the foregoing embodiment may be implemented by software in addition to a necessary universal hardware platform or by hardware only. In most circumstances, the former is a preferred implementation manner. Based on such an understanding, the technical solutions of this application essentially, or the part contributing to the prior art may be implemented in a form of a software product. The computer software product is stored in a storage medium (for example, a ROM/RAM, a magnetic disk, or a compact disc), and includes a plurality of instructions for instructing a terminal (which may be a mobile phone, a computer, a server, an air conditioner, a network device, or the like) to perform the method described in the embodiments of this application.

It can be understood that the embodiments described in the present disclosure may be implemented by hardware, software, firmware, middleware, microcode, or a combination thereof. For hardware implementation, a module, a unit, a subunit, or the like may be implemented in one or more application specific integrated circuits (ASIC), a digital signal processor (DSP), a digital signal processing device (DSPD), a programmable logic device (PLD), a field-programmable gate array (FPGA), a general purpose processor, a controller, a microcontroller, a microprocessor, another electronic unit configured to perform the functions described in the present disclosure, or a combination thereof.

For software implementation, techniques described in the embodiments of the present disclosure may be implemented by executing functional modules (for example, a process and a function) in the embodiments of the present disclosure. A software code may be stored in the memory and executed by the processor. The memory may be implemented in the processor or outside the processor.

The embodiments of this application are described above with reference to the accompanying drawings, but this application is not limited to the foregoing specific implementation manners. The foregoing specific implementation manners are merely schematic instead of restrictive. Under enlightenment of this application, a person of ordinary skills in the art may make many forms without departing from aims and the protection scope of claims of this application, all of which fall within the protection scope of this application.

What is claimed is:

1. A modulation method, performed by a first communications device, and comprising:
obtaining a bitstream to be transmitted; and
determining, based on a bit in the bitstream and a mapping relationship, a forwarding pattern and a manner of modulating a forwarding phase in the forwarding pattern, wherein
the mapping relationship is used to indicate a mapping relationship between the bit, the forwarding pattern, and a target index, and is used to indicate a mapping relationship between the bit and the phase modulation manner; and
the target index comprises at least one of the following: an index of a transmit antenna, an index of a receive antenna, and an index of an area after division of an array of assistance nodes.

2. The method according to claim 1, wherein the determining, based on a bit in the bitstream and a mapping relationship, a forwarding pattern and a manner of modulating a forwarding phase in the forwarding pattern comprises:
determining the forwarding pattern based on a first bit in the bitstream and a first mapping relationship, wherein the first mapping relationship is used to indicate a mapping relationship between the first bit, the index of the receive antenna, and a forwarding pattern corresponding to the index of the receive antenna; and a power of the receive antenna is greater than or equal to a first preset threshold; and
modulating the forwarding phase in the forwarding pattern based on a second bit in the bitstream and a second mapping relationship, wherein the second mapping relationship is used to indicate a mapping relationship between the second bit and the manner of modulating a phase value.

3. The method according to claim 2, wherein before the obtaining a bitstream to be transmitted, the method further comprises:
training the forwarding pattern based on a radio signal sent by the first communications device to a second communications device to obtain a training result, wherein the training result comprises: the first mapping relationship between the index of the receive antenna, the forwarding pattern, and the first bit; or
receiving a measurement signal sent by the second communications device, and calculating the measurement signal to obtain a calculation result, wherein the calculation result comprises: the first mapping relationship between the index of the receive antenna, the forwarding pattern, and the first bit.

4. The method according to claim 1, wherein the determining, based on a bit in the bitstream and a mapping relationship, a forwarding pattern and a manner of modulating a forwarding phase in the forwarding pattern comprises:
determining, based on a third bit in the bitstream and a third mapping relationship, an index of a first target area, wherein the third mapping relationship is used to indicate a mapping relationship between the index of the first target area and the third bit, and the first target area is an area in a plurality of areas after the division of the array of assistance nodes;
determining, by using the index of the first target area, the forwarding pattern based on a fourth bit in the bitstream and a fourth mapping relationship, wherein the fourth mapping relationship is used to indicate a mapping relationship between the fourth bit, the index of the receive antenna, and a forwarding pattern corresponding to the index of the receive antenna; and a power of the receive antenna is greater than or equal to a second preset threshold; and
modulating the forwarding phase in the determined forwarding pattern based on a fifth bit in the bitstream and a fifth mapping relationship, wherein the fifth mapping relationship is used to indicate a mapping relationship between the fifth bit and the manner of modulating a phase value.

5. The method according to claim 4, wherein before the bitstream to be transmitted between the first communications device and a second communications device is obtained, the method further comprises:
dividing the array of assistance nodes into the plurality of areas, and training the forwarding pattern based on a radio signal sent by the first communications device to the second communications device to obtain a training result, wherein the training result comprises: the fourth mapping relationship between the index of the receive antenna, the forwarding pattern, and the fourth bit; and the fourth mapping relationship is obtained through training in each target area; or
receiving a measurement signal sent by the second communications device, and calculating the measurement signal to obtain a calculation result, wherein the calculation result comprises: the fourth mapping relationship between the index of the receive antenna, the forwarding pattern, and the fourth bit; and the fourth mapping relationship is obtained through calculation in each target area.

6. The method according to claim 4, wherein the first target area comprises one or more areas in the plurality of areas after the division of the array of assistance nodes.

7. The method according to claim 1, wherein the determining, based on a bit in the bitstream and a mapping relationship, a forwarding pattern and a manner of modulating a forwarding phase in the forwarding pattern comprises:
determining the index of the transmit antenna based on a sixth bit in the bitstream and a sixth mapping relationship, wherein the sixth mapping relationship is used to indicate a mapping relationship between the index of the transmit antenna and the sixth bit; and a power of the transmit antenna is greater than or equal to a third preset threshold;
determining, by using the index of the transmit antenna, an index of a second target area based on a seventh bit in the bitstream and a seventh mapping relationship, wherein the seventh mapping relationship is used to indicate a mapping relationship between the seventh bit and the index of the second target area; and the second target area is an area in a plurality of areas after the division of the array of assistance nodes; and
modulating the forwarding phase in the forwarding pattern corresponding to the second target area based on an eighth bit in the bitstream and an eighth mapping relationship, wherein the eighth mapping relationship is used to indicate a mapping relationship between the eighth bit and the manner of modulating a phase value.

8. The method according to claim 1, wherein the determining, based on a bit in the bitstream and a mapping relationship, a forwarding pattern and a manner of modulating a forwarding phase in the forwarding pattern comprises:

determining the index of the transmit antenna based on a ninth bit in the bitstream and a ninth mapping relationship, wherein the ninth mapping relationship is used to indicate a mapping relationship between the index of the transmit antenna and the ninth bit; and a power of the transmit antenna is greater than or equal to a fourth preset threshold;

determining, by using the index of the transmit antenna, the forwarding pattern based on a tenth bit in the bitstream and a tenth mapping relationship, wherein the tenth mapping relationship is used to indicate a mapping relationship between the tenth bit, the index of the receive antenna, and a forwarding pattern corresponding to the index of the receive antenna; and a power of the receive antenna is greater than or equal to a fifth preset threshold; and modulating the forwarding phase in the determined forwarding pattern based on an eleventh bit in the bitstream and an eleventh mapping relationship, wherein the eleventh mapping relationship is used to indicate a mapping relationship between the eleventh bit and the manner of modulating a phase value.

9. The method according to claim 8, wherein before the bitstream to be transmitted between the first communications device and a second communications device is obtained, the method further comprises:

dividing the array of assistance nodes into the plurality of areas, and training the forwarding pattern based on a radio signal sent by the first communications device to the second communications device to obtain a training result, wherein the training result comprises: the tenth mapping relationship, obtained based on the index of the transmit antenna, between the index of the receive antenna, the forwarding pattern, and the tenth bit; or receiving a measurement signal sent by the second communications device, and calculating the measurement signal to obtain a calculation result, wherein the calculation result comprises: the tenth mapping relationship, obtained based on the index of the transmit antenna, between the index of the receive antenna, the forwarding pattern, and the tenth bit.

10. The method according to claim 1, wherein the determining, based on a bit in the bitstream and a mapping relationship, a forwarding pattern and a manner of modulating a forwarding phase in the forwarding pattern comprises:

determining, based on a twelfth bit in the bitstream and a twelfth mapping relationship, an index of a third target area, wherein the twelfth mapping relationship is used to indicate a mapping relationship between the index of the third target area and the twelfth bit, and the third target area is an area in a plurality of areas after the division of the array of assistance nodes;

determining the index of the transmit antenna based on a thirteenth bit in the bitstream and a thirteenth mapping relationship, wherein the thirteenth mapping relationship is used to indicate a mapping relationship between the index of the transmit antenna and the thirteenth bit; and a power of the transmit antenna is greater than or equal to a sixth preset threshold;

determining, by using the index of the third target area and the index of the transmit antenna, the forwarding pattern based on a fourteenth bit in the bitstream and a fourteenth mapping relationship, wherein the fourteenth mapping relationship is used to indicate a mapping relationship between the fourteenth bit, the index of the receive antenna, and a forwarding pattern corresponding to the index of the receive antenna; and a power of the receive antenna is greater than or equal to a seventh preset threshold; and modulating the forwarding phase in the determined forwarding pattern based on a fifteenth bit in the bitstream and a fifteenth mapping relationship, wherein the fifteenth mapping relationship is used to indicate a mapping relationship between the fifteenth bit and the manner of modulating a phase value.

11. The method according to claim 10, wherein before the bitstream to be transmitted between the first communications device and a second communications device is obtained, the method further comprises:

dividing the array of assistance nodes into the plurality of areas, and training the forwarding pattern based on a radio signal sent by the first communications device to the second communications device to obtain a training result, wherein the training result comprises: the fourteenth mapping relationship between the fourteenth bit, the index of the receive antenna, and a forwarding pattern corresponding to the index of the receive antenna that are obtained based on the index of the third target area and the index of the transmit antenna; or receiving a measurement signal sent by the second communications device, and calculating the measurement signal to obtain a calculation result, wherein the calculation result comprises: the fourteenth mapping relationship between the fourteenth bit, the index of the receive antenna, and a forwarding pattern corresponding to the index of the receive antenna that are obtained based on the index of the third target area and the index of the transmit antenna.

12. A communications device, comprising a processor, a memory, and a program or an instruction stored in the memory and executable on the processor, wherein when the program or the instruction is executed by the processor, the steps of a modulation method according are implemented, wherein the method comprises:

obtaining a bitstream to be transmitted; and determining, based on a bit in the bitstream and a mapping relationship, a forwarding pattern and a manner of modulating a forwarding phase in the forwarding pattern, wherein the mapping relationship is used to indicate a mapping relationship between the bit, the forwarding pattern, and a target index, and is used to indicate a mapping relationship between the bit and the phase modulation manner; and the target index comprises at least one of the following: an index of a transmit antenna, an index of a receive antenna, and an index of an area after division of an array of assistance nodes.

13. The communications device according to claim 12, wherein the determining, based on a bit in the bitstream and a mapping relationship, a forwarding pattern and a manner of modulating a forwarding phase in the forwarding pattern comprises:

determining the forwarding pattern based on a first bit in the bitstream and a first mapping relationship, wherein the first mapping relationship is used to indicate a mapping relationship between the first bit, the index of the receive antenna, and a forwarding pattern corresponding to the index of the receive antenna; and a power of the receive antenna is greater than or equal to a first preset threshold; and modulating the forwarding phase in the forwarding pattern based on a second bit in the bitstream and a second mapping relationship, wherein the second mapping relationship is used to indicate a mapping relationship between the second bit and the manner of modulating a phase value.

14. The communications device according to claim 13, wherein before the obtaining a bitstream to be transmitted, the method further comprises:
    training the forwarding pattern based on a radio signal sent by the first communications device to a second communications device to obtain a training result, wherein the training result comprises: the first mapping relationship between the index of the receive antenna, the forwarding pattern, and the first bit; or
    receiving a measurement signal sent by the second communications device, and calculating the measurement signal to obtain a calculation result, wherein the calculation result comprises: the first mapping relationship between the index of the receive antenna, the forwarding pattern, and the first bit.

15. The communications device according to claim 12, wherein the determining, based on a bit in the bitstream and a mapping relationship, a forwarding pattern and a manner of modulating a forwarding phase in the forwarding pattern comprises:
    determining, based on a third bit in the bitstream and a third mapping relationship, an index of a first target area, wherein the third mapping relationship is used to indicate a mapping relationship between the index of the first target area and the third bit, and the first target area is an area in a plurality of areas after the division of the array of assistance nodes;
    determining, by using the index of the first target area, the forwarding pattern based on a fourth bit in the bitstream and a fourth mapping relationship, wherein the fourth mapping relationship is used to indicate a mapping relationship between the fourth bit, the index of the receive antenna, and a forwarding pattern corresponding to the index of the receive antenna; and a power of the receive antenna is greater than or equal to a second preset threshold; and
    modulating the forwarding phase in the determined forwarding pattern based on a fifth bit in the bitstream and a fifth mapping relationship, wherein the fifth mapping relationship is used to indicate a mapping relationship between the fifth bit and the manner of modulating a phase value.

16. The communications device according to claim 12, wherein the determining, based on a bit in the bitstream and a mapping relationship, a forwarding pattern and a manner of modulating a forwarding phase in the forwarding pattern comprises:
    determining the index of the transmit antenna based on a sixth bit in the bitstream and a sixth mapping relationship, wherein the sixth mapping relationship is used to indicate a mapping relationship between the index of the transmit antenna and the sixth bit; and a power of the transmit antenna is greater than or equal to a third preset threshold;
    determining, by using the index of the transmit antenna, an index of a second target area based on a seventh bit in the bitstream and a seventh mapping relationship, wherein the seventh mapping relationship is used to indicate a mapping relationship between the seventh bit and the index of the second target area; and the second target area is an area in a plurality of areas after the division of the array of assistance nodes; and
    modulating the forwarding phase in the forwarding pattern corresponding to the second target area based on an eighth bit in the bitstream and an eighth mapping relationship, wherein the eighth mapping relationship is used to indicate a mapping relationship between the eighth bit and the manner of modulating a phase value.

17. A non-transitory readable storage medium, wherein the non-transitory readable storage medium stores a program or an instruction, and when the program or the instruction is executed by a processor, the steps of a modulation method are implemented, wherein the method comprises:
    obtaining a bitstream to be transmitted; and
    determining, based on a bit in the bitstream and a mapping relationship, a forwarding pattern and a manner of modulating a forwarding phase in the forwarding pattern, wherein
    the mapping relationship is used to indicate a mapping relationship between the bit, the forwarding pattern, and a target index, and is used to indicate a mapping relationship between the bit and the phase modulation manner; and
    the target index comprises at least one of the following: an index of a transmit antenna, an index of a receive antenna, and an index of an area after division of an array of assistance nodes.

18. The non-transitory readable storage medium according to claim 17, wherein the determining, based on a bit in the bitstream and a mapping relationship, a forwarding pattern and a manner of modulating a forwarding phase in the forwarding pattern comprises:
    determining the forwarding pattern based on a first bit in the bitstream and a first mapping relationship, wherein the first mapping relationship is used to indicate a mapping relationship between the first bit, the index of the receive antenna, and a forwarding pattern corresponding to the index of the receive antenna; and a power of the receive antenna is greater than or equal to a first preset threshold; and
    modulating the forwarding phase in the forwarding pattern based on a second bit in the bitstream and a second mapping relationship, wherein the second mapping relationship is used to indicate a mapping relationship between the second bit and the manner of modulating a phase value.

19. The non-transitory readable storage medium according to claim 18, wherein before the obtaining a bitstream to be transmitted, the method further comprises:
    training the forwarding pattern based on a radio signal sent by the first communications device to a second communications device to obtain a training result, wherein the training result comprises: the first mapping relationship between the index of the receive antenna, the forwarding pattern, and the first bit; or
    receiving a measurement signal sent by the second communications device, and calculating the measurement signal to obtain a calculation result, wherein the calculation result comprises: the first mapping relationship between the index of the receive antenna, the forwarding pattern, and the first bit.

20. The non-transitory readable storage medium according to claim 17, wherein the determining, based on a bit in the bitstream and a mapping relationship, a forwarding pattern and a manner of modulating a forwarding phase in the forwarding pattern comprises:
    determining, based on a third bit in the bitstream and a third mapping relationship, an index of a first target area, wherein the third mapping relationship is used to indicate a mapping relationship between the index of the first target area and the third bit, and the first target area is an area in a plurality of areas after the division of the array of assistance nodes;

determining, by using the index of the first target area, the forwarding pattern based on a fourth bit in the bitstream and a fourth mapping relationship, wherein the fourth mapping relationship is used to indicate a mapping relationship between the fourth bit, the index of the receive antenna, and a forwarding pattern corresponding to the index of the receive antenna; and a power of the receive antenna is greater than or equal to a second preset threshold; and modulating the forwarding phase in the determined forwarding pattern based on a fifth bit in the bitstream and a fifth mapping relationship, wherein the fifth mapping relationship is used to indicate a mapping relationship between the fifth bit and the manner of modulating a phase value.

* * * * *